United States Patent
Takeda et al.

(10) Patent No.: US 12,335,921 B2
(45) Date of Patent: Jun. 17, 2025

(54) VIRTUAL CELL GROUPING FOR WIRELESS COMMUNICATIONS

(71) Applicant: QUALCOMM Incorporated, San Diego, CA (US)

(72) Inventors: Kazuki Takeda, Tokyo (JP); Juan Montojo, San Diego, CA (US); Peter Gaal, San Diego, CA (US); Wanshi Chen, San Diego, CA (US); Huilin Xu, Temecula, CA (US); Mostafa Khoshnevisan, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 473 days.

(21) Appl. No.: 17/726,792

(22) Filed: Apr. 22, 2022

(65) Prior Publication Data

US 2023/0345419 A1 Oct. 26, 2023

(51) Int. Cl.
*H04W 72/02* (2009.01)
*H04L 5/00* (2006.01)
*H04W 72/044* (2023.01)
*H04W 72/23* (2023.01)

(52) U.S. Cl.
CPC ........... *H04W 72/02* (2013.01); *H04L 5/0053* (2013.01); *H04W 72/044* (2013.01); *H04W 72/23* (2023.01)

(58) Field of Classification Search
CPC . H04W 5/0048; H04W 72/02; H04W 72/044; H04W 72/23; H04L 5/0003; H04L 5/0053
See application file for complete search history.

(56) References Cited

U.S. PATENT DOCUMENTS

| | | | | |
|---|---|---|---|---|
| 11,743,006 B2* | 8/2023 | Xiong | ................... | H04L 5/0053 370/330 |
| 2014/0254517 A1* | 9/2014 | Nam | .................... | H04B 7/0456 370/329 |
| 2016/0013912 A1* | 1/2016 | Ji | ....................... | H04B 7/15542 370/329 |
| 2019/0182007 A1* | 6/2019 | Liu | ....................... | H04L 5/0048 |
| 2020/0389283 A1* | 12/2020 | Manolakos | ........... | H04L 5/0044 |
| 2022/0110181 A1* | 4/2022 | Miao | ..................... | H04L 1/1822 |
| 2023/0345419 A1* | 10/2023 | Takeda | .................. | H04W 16/02 |
| 2024/0284345 A1* | 8/2024 | Ying | ..................... | H04L 5/0073 |

* cited by examiner

*Primary Examiner* — Raj Jain
(74) *Attorney, Agent, or Firm* — Holland & Hart LLP

(57) ABSTRACT

Methods, systems, and devices for wireless communications are described. A user equipment (UE) may receive control signaling from a network entity configuring a virtual cell group with multiple cells, where each cell may have a radio frequency spectrum band with a frequency gap that exceeds an operating band threshold. The network entity may transmit additional control signaling including information for the virtual cell group. In some cases, the additional control signaling may include resource allocation information for the virtual cell group, such that the UE may communicate multiple shared channels via different cells in the virtual cell group using the resources indicated in the resource allocation information. In some other cases, the additional control signaling may include a cancellation indication for the virtual cell group, such that the UE may refrain from communicating signals using one or more cells of the virtual cell group.

30 Claims, 15 Drawing Sheets

VIRTUAL CELL GROUPING FOR WIRELESS COMMUNICATIONS

FIELD OF TECHNOLOGY

The following relates to wireless communications, including virtual cell grouping for wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support virtual cell grouping for wireless communications. For example, the described techniques provide for a network entity to configure a group of cells, which may be referred to as a virtual cell group or super cell group, at a user equipment (UE) for communication scheduling or cancellation. In some examples, the network entity may transmit control signaling (e.g., radio resource control (RRC) signaling) configuring a virtual cell group with multiple cells, where each cell may have a radio frequency spectrum band with a frequency gap that exceeds an operating band threshold. The network entity may transmit additional control signaling, such as a downlink control information (DCI) message including information for the virtual cell group (e.g., rather than transmitting a DCI per cell in the virtual cell group). In some cases, the DCI message may include resource allocation information for the virtual cell group, such that the UE may communicate multiple shared channels via different cells in the virtual cell group using the resources indicated in the resource allocation information. In some other cases, the DCI message may include a cancellation indication for the virtual cell group, such that the UE may refrain from communicating signals using one or more cells of the virtual cell group.

A method for wireless communication at a UE is described. The method may include receiving a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold, receiving a second control signal that indicates resource allocation information for the virtual cell group, the resource allocation information indicating a first set of resource allocation information for a first shared channel for the first cell and a second set of resource allocation information for a second shared channel for the second cell, and communicating the first shared channel via the first cell based on the first set of resource allocation information and the second shared channel via the second cell based on the second set of resource allocation information.

An apparatus for wireless communication at a UE is described. The apparatus may include a processor, memory coupled with the processor, and instructions stored in the memory. The instructions may be executable by the processor to cause the apparatus to receive a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold, receive a second control signal that indicates resource allocation information for the virtual cell group, the resource allocation information indicating a first set of resource allocation information for a first shared channel for the first cell and a second set of resource allocation information for a second shared channel for the second cell, and communicate the first shared channel via the first cell based on the first set of resource allocation information and the second shared channel via the second cell based on the second set of resource allocation information.

Another apparatus for wireless communication at a UE is described. The apparatus may include means for receiving a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold, means for receiving a second control signal that indicates resource allocation information for the virtual cell group, the resource allocation information indicating a first set of resource allocation information for a first shared channel for the first cell and a second set of resource allocation information for a second shared channel for the second cell, and means for communicating the first shared channel via the first cell based on the first set of resource allocation information and the second shared channel via the second cell based on the second set of resource allocation information.

A non-transitory computer-readable medium storing code for wireless communication at a UE is described. The code may include instructions executable by a processor to receive a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold, receive a second control signal that indicates resource allocation information for the virtual cell group, the resource allocation information indicating a first set of resource allocation information for a first shared channel for the first cell and a second set of resource allocation information for a second shared channel for the second cell, and communicate the first shared channel via the first cell based on the first set of resource allocation information and the second shared channel via the second cell based on the second set of resource allocation information.

In some examples of the method, apparatuses, and non-transitory computer-readable medium described herein, receiving the second control signal may include operations, features, means, or instructions for receiving an indication that one or more first indices in a resource grid corresponding to the virtual cell group and one or more second indices in the resource grid corresponding to the virtual cell group may be non-consecutive between the first cell and the second cell, where the resource allocation information indicates that one or more indices may be assigned to resources associated with the frequency gap.

In some examples of the method, apparatuses, and non-transitory computer-readable medium described herein, receiving the second control signal may include operations, features, means, or instructions for receiving an indication that one or more first indices in a resource grid corresponding to the virtual cell group and one or more second indices in the resource grid corresponding to the virtual cell group may be consecutive between the first cell and the second cell.

In some examples of the method, apparatuses, and non-transitory computer-readable medium described herein, receiving the second control signal may include operations, features, means, or instructions for receiving an indication of a resource grid that may be common between the first cell and the second cell, where a resource group size associated with the resource allocation information may be based on a number of resource blocks associated with the virtual cell group.

Some examples of the method, apparatuses, and non-transitory computer-readable medium described herein may further include operations, features, means, or instructions for receiving a third control signal that indicates for the UE to switch from one or more second bandwidth parts (BWPs) per cell in the virtual cell group to the first BWP and performing the BWP switching for the set of multiple cells in accordance with the third control signal, where receiving the second control signal may be based on performing the BWP switching.

Some examples of the method, apparatuses, and non-transitory computer-readable medium described herein may further include operations, features, means, or instructions for switching a transport block (TB) operation from a first operation with a TB per cell in the virtual cell group and a second operation with the TB for the virtual cell group based on performing the BWP switching.

Some examples of the method, apparatuses, and non-transitory computer-readable medium described herein may further include operations, features, means, or instructions for switching a control signal operation from a first operation with a control signal per cell in the virtual cell group and a second operation with the control signal for the virtual cell group based on performing the BWP switching.

Some examples of the method, apparatuses, and non-transitory computer-readable medium described herein may further include operations, features, means, or instructions for switching a cell configuration operation from a first operation with a configuration for first communications per cell in the virtual cell group and a second operation with the configuration for second communications for the virtual cell group based on performing the BWP switching.

In some examples of the method, apparatuses, and non-transitory computer-readable medium described herein, receiving the second control signal may include operations, features, means, or instructions for receiving an indication of a first gap between a first uplink resource and a first downlink resource associated with the first cell and of a second gap between a second uplink resource and a second downlink resource associated with the second cell.

Some examples of the method, apparatuses, and non-transitory computer-readable medium described herein may further include operations, features, means, or instructions for activating a first BWP for the first cell based on the first set of resource allocation information and activating a second BWP for the second cell based on the second set of resource allocation information.

Some examples of the method, apparatuses, and non-transitory computer-readable medium described herein may further include operations, features, means, or instructions for determining that a set of multiple physical resource blocks (PRBs) for the communicating may be indexed according to the first BWP and the second BWP and selecting one or more parameters for the first BWP for the first cell and the second BWP for the second cell based on the determining.

In some examples of the method, apparatuses, and non-transitory computer-readable medium described herein, the first set of resource allocation information indicates a first set of unpaired uplink and downlink resources for the first shared channel and the second set of resource allocation information indicates a second set of unpaired uplink and downlink resources for the second shared channel and the method, apparatuses, and non-transitory computer-readable medium may include further operations, features, means, or instructions for activating a BWP for the virtual cell group based on a set of BWP parameters determined based on the resource allocation information, the BWP corresponding to a first bandwidth for the first cell and corresponding to a second bandwidth for the second cell.

Some examples of the method, apparatuses, and non-transitory computer-readable medium described herein may further include operations, features, means, or instructions for determining a set of multiple PRBs for the communicating may be indexed according to the first cell and the second cell and selecting the set of BWP parameters for the virtual cell group based on the determining.

In some examples of the method, apparatuses, and non-transitory computer-readable medium described herein, the communicating may include operations, features, means, or instructions for communicating a first TB using the first cell and a second TB using the second cell.

In some examples of the method, apparatuses, and non-transitory computer-readable medium described herein, the communicating may include operations, features, means, or instructions for communicating a first portion of a TB associated with the virtual cell group using the first cell and a second portion of the TB using the second cell.

In some examples of the method, apparatuses, and non-transitory computer-readable medium described herein, the communicating may include operations, features, means, or instructions for receiving a signal using the first cell based on the first set of resource allocation information, using the second cell based on the second set of resource allocation information, or both.

In some examples of the method, apparatuses, and non-transitory computer-readable medium described herein, the communicating may include operations, features, means, or instructions for transmitting a signal using the first cell based on the first set of resource allocation information, using the second cell based on the second set of resource allocation information, or both.

In some examples of the method, apparatuses, and non-transitory computer-readable medium described herein, the first control signal indicates that the set of multiple cells correspond to a downlink communication direction and the method, apparatuses, and non-transitory computer-readable medium may include further operations, features, means, or instructions for receiving a first signal using the first cell based on the first set of resource allocation information, using the second cell based on the second set of resource allocation information, or both, receiving a third control signal that indicates additional resource allocation information for a third cell, where the third cell may be excluded from the virtual cell group, and transmitting a second signal using the third cell based on the additional resource allocation information.

In some examples of the method, apparatuses, and non-transitory computer-readable medium described herein, the set of multiple cells in the virtual cell group may be associated with a downlink communication direction and a subset of cells of the set of multiple cells in the virtual cell group may be associated with an uplink communication direction.

In some examples of the method, apparatuses, and non-transitory computer-readable medium described herein, the first control signal includes an RRC signal.

In some examples of the method, apparatuses, and non-transitory computer-readable medium described herein, the second control signal includes a DCI message.

A method for wireless communication at a UE is described. The method may include receiving a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold, receiving a second control signal including a cancellation indication for the virtual cell group, the cancellation indication indicating a cancellation of the communications during a set of time resources associated with the first cell and the second cell, and refraining from communicating one or more signals using the first cell, the second cell, or both during the set of time resources based on the cancellation indication.

An apparatus for wireless communication at a UE is described. The apparatus may include a processor, memory coupled with the processor, and instructions stored in the memory. The instructions may be executable by the processor to cause the apparatus to receive a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold, receive a second control signal including a cancellation indication for the virtual cell group, the cancellation indication indicating a cancellation of the communications during a set of time resources associated with the first cell and the second cell, and refrain from communicating one or more signals using the first cell, the second cell, or both during the set of time resources based on the cancellation indication.

Another apparatus for wireless communication at a UE is described. The apparatus may include means for receiving a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold, means for receiving a second control signal including a cancellation indication for the virtual cell group, the cancellation indication indicating a cancellation of the communications during a set of time resources associated with the first cell and the second cell, and means for refraining from communicating one or more signals using the first cell, the second cell, or both during the set of time resources based on the cancellation indication.

A non-transitory computer-readable medium storing code for wireless communication at a UE is described. The code may include instructions executable by a processor to receive a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold, receive a second control signal including a cancellation indication for the virtual cell group, the cancellation indication indicating a cancellation of the communications during a set of time resources associated with the first cell and the second cell, and refrain from communicating one or more signals using the first cell, the second cell, or both during the set of time resources based on the cancellation indication.

In some examples of the method, apparatuses, and non-transitory computer-readable medium described herein, receiving the second control signal may include operations, features, means, or instructions for receiving a respective cancellation indication for the first cell and the second cell.

In some examples of the method, apparatuses, and non-transitory computer-readable medium described herein, receiving the second control signal may include operations, features, means, or instructions for receiving the cancellation indication for the set of multiple cells assigned to the virtual cell group.

Some examples of the method, apparatuses, and non-transitory computer-readable medium described herein may further include operations, features, means, or instructions for determining the set of time resources span a portion of a TB and refraining from communicating the one or more signals during the portion of the TB.

Some examples of the method, apparatuses, and non-transitory computer-readable medium described herein may further include operations, features, means, or instructions for determining the set of time resources span a TB and refraining from communicating the one or more signals during the TB.

DETAILED DESCRIPTION

In some wireless communication systems, a wireless device, such as a user equipment (UE), may communicate using multiple cells that span different frequency bands (e.g., operating bands, radio frequency spectrum bands, or frequency ranges such as a first frequency range 1 (FR1), a second frequency range 2 (FR2), etc.). A cell may support multiple carriers, where each carrier spans one or more frequency bands. A network entity (e.g., a base station), may schedule uplink or downlink data transmissions on the multiple cells. Each cell may utilize or support a set of carriers, such as paired carriers (where an uplink carrier has a respective paired downlink carrier) or unpaired carriers. For example, the network entity may transmit a scheduling control information message to the UE for each cell, such that the UE may transmit and receive according to the resources specified in the message (e.g., on the set of carriers). However, transmitting messages to schedule each cell may incur a high signaling overhead.

As described herein, to reduce signaling overhead, a network entity may configure a UE with a virtual cell group that includes multiple cells (e.g., when a frequency gap between radio frequency spectrum bands of different cells exceeds a threshold), where the UE may receive control signaling on a per virtual cell group basis, may switch bandwidth parts (BWPs) per virtual cell group, or both. The virtual cell group may be referred to as a virtual cell or a super cell. A network entity may configure the virtual cell group at the UE, such as via radio resource control (RRC) signaling. In some cases, after configuring the virtual cell group, the network entity may transmit a downlink control information (DCI) message scheduling shared channels for the cells in the virtual cell group. The UE may communicate the shared channels using resource allocation information indicated by or contained within the DCI message. Additionally, or alternatively, the DCI message may include a cancellation indication for the virtual cell group, which may cancel one or more scheduled communications of the channels. In some examples, the DCI message may indicate for the UE to switch between one or more BWPs for the virtual cell group. Switching BWPs for the virtual cell group, rather than per cell in the virtual cell group, may enable the UE to transmit or receive a transport block (TB) per virtual cell group, receive a DCI for multi-cell scheduling, activate or deactivate BWPs per virtual cell group, or the like.

Aspects of the disclosure are initially described in the context of wireless communications systems. Aspects of the disclosure are further described in the context of resource diagrams and process flows. Aspects of the disclosure are further illustrated by and described with reference to apparatus diagrams, system diagrams, and flowcharts that relate to virtual cell grouping for wireless communications.

Figure 1:
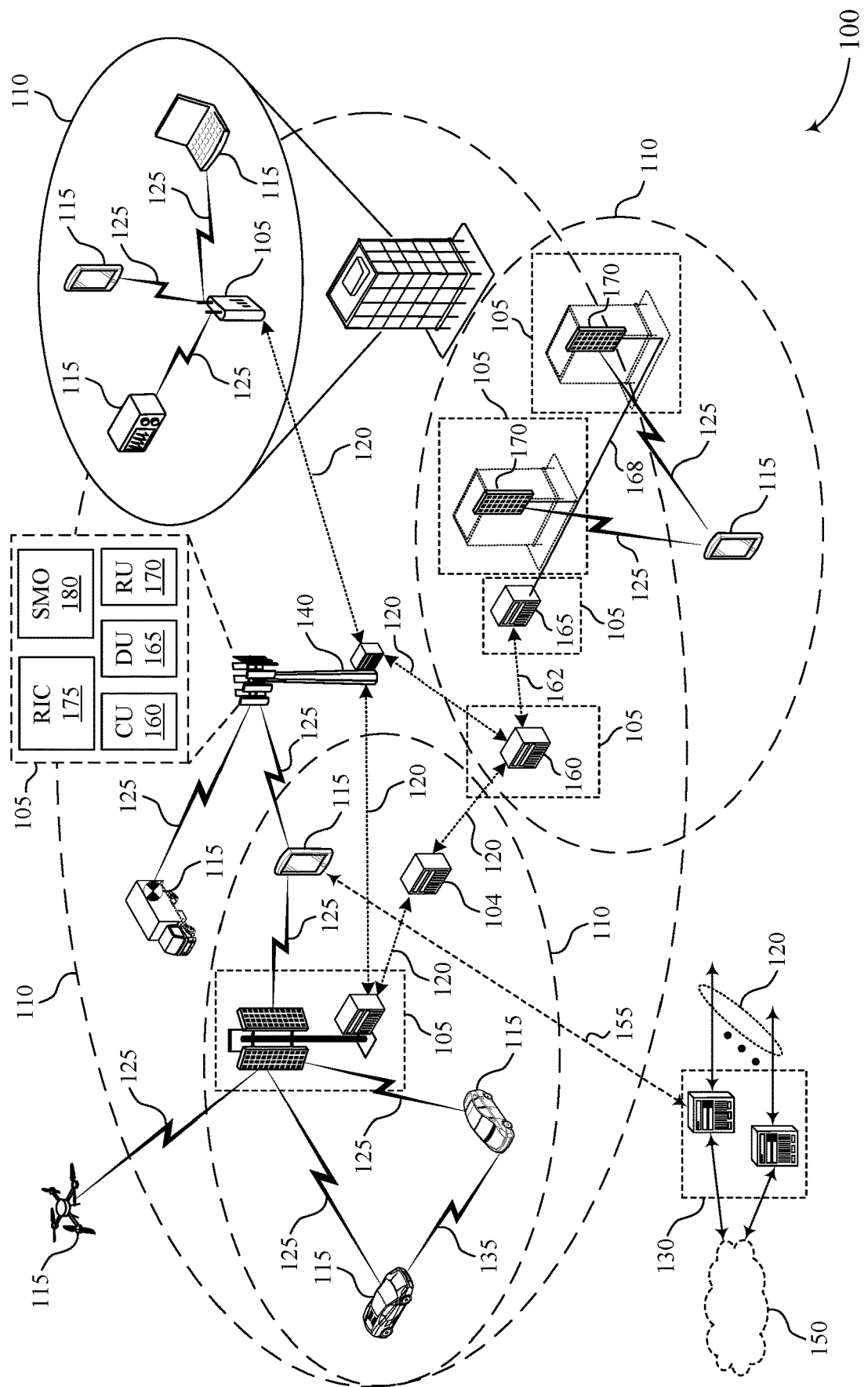
FIGS. 1 and 2 illustrate examples of wireless communications systems that support virtual cell grouping for wireless communications in accordance with one or more aspects of the present disclosure.

FIG. 1 illustrates an example of a wireless communications system 100 that supports virtual cell grouping for wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115)

within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support virtual cell grouping for wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The electromagnetic spectrum may be subdivided (e.g., based on frequency or wavelength) into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In some examples, to reduce signaling overhead, a network entity 105 may configure a UE 115 with a virtual cell group when a frequency gap between radio frequency spectrum bands of different cells exceeds a threshold, where the UE 115 may receive control signaling per virtual cell group, switch BWPs per virtual cell group, or both. A network entity 105 may configure the virtual cell group at the UE 115, such as via RRC signaling. In some cases, after configuring the virtual cell group, the network entity 105 may transmit a DCI message scheduling shared channels for the cells in the virtual cell group. The UE 115 may communicate the channels using resource allocation information in the DCI message. Additionally, or alternatively, the DCI message may include a cancellation indication for the virtual cell group, which may cancel the communication of the channels. In some examples, the DCI message may indicate for the UE to switch between one or more BWPs for the virtual cell group. Switching BWPs for the virtual cell group, rather than per cell in the virtual cell group, may provide for the UE 115 to transmit or receive a TB per virtual cell group, receive a DCI for multi-cell scheduling, activate or deactivate BWPs per virtual cell group, or the like.

Figure 2:
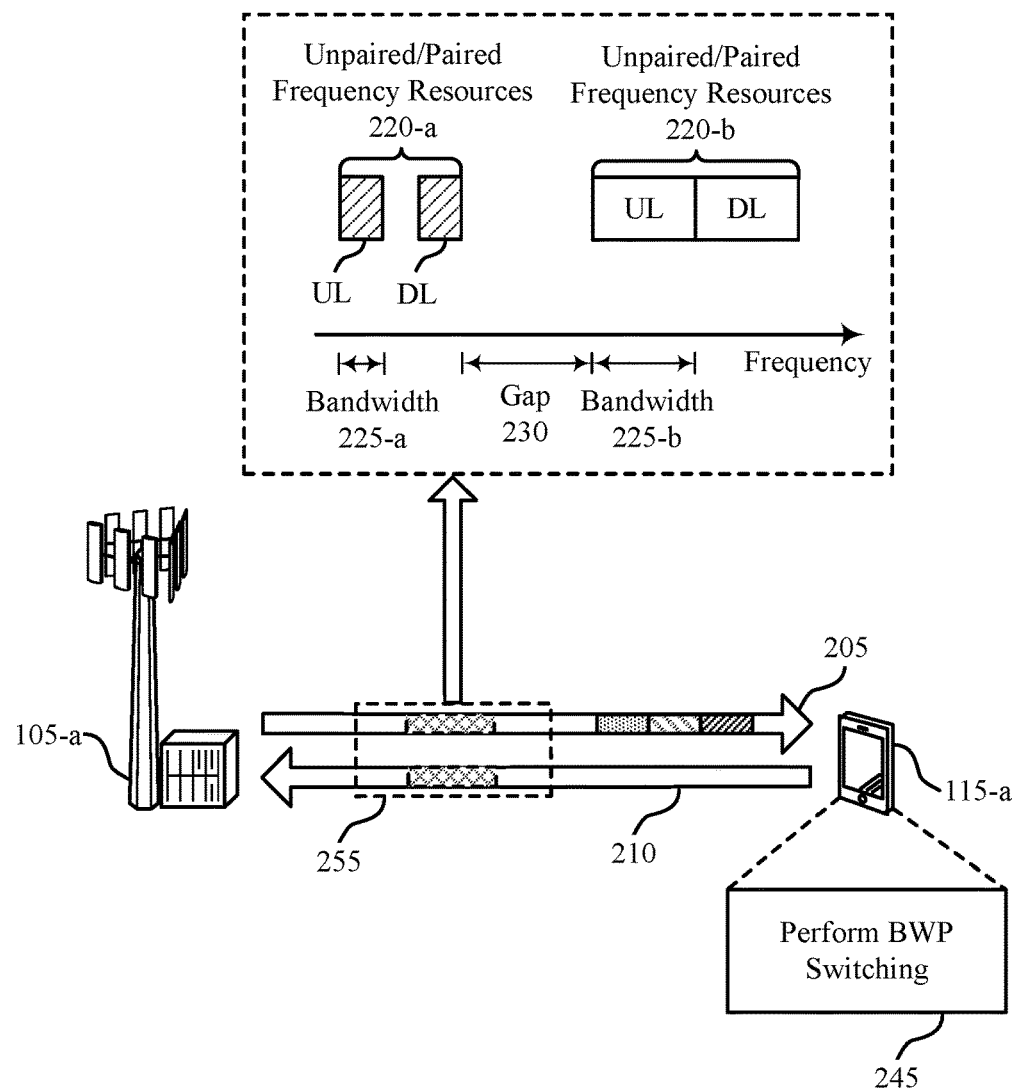
Figure 2:
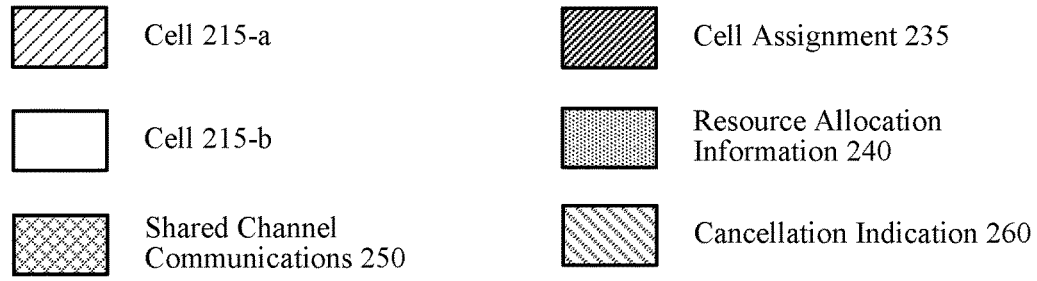

FIG. 2 illustrates an example of a wireless communications system 200 that supports virtual cell grouping for wireless communications in accordance with one or more aspects of the present disclosure. The wireless communications system 200 may implement or be implemented to realize aspects of the wireless communications system 100. For example, the wireless communications system 200 illustrates communication between one or more UEs and network entities, such as a UE 115-*a* and a network entity 105-*a*, which may be examples of corresponding devices described herein, including with reference to FIG. 1. The wireless communications system 200 may support signaling that configures a UE 115-*a* with a virtual cell group enabling the network entity 105-*a* to transmit additional signaling for the virtual cell group rather than separate signaling for each individual cell.

In some cases, the UE 115-*a* may be in communication with the network entity 105-*a*. For example, the network entity 105-*a* may transmit control information, data, or both to the UE 115-*a* via a downlink communication link 205. The UE 115-*a* may transmit control information, data, or both to the network entity 105-*a* via an uplink communication link 210. The UE 115-*a* may support communications across multiple cells, each cell having a different operating band in a radio frequency spectrum band. For example, the UE 115-*a* may support a cell 215-*a* and a cell 215-*b* with a set of frequency resources (e.g., unpaired/paired frequency resources 220-*a* and unpaired/paired frequency resource 220-*b*) for communications between wireless devices.

In some examples, the unpaired/paired frequency resources 220-*a*, the unpaired/paired frequency resources 220-*b*, or both may include paired frequency resources, such that an uplink bandwidth may have a defined respective downlink bandwidth (e.g., in a different or distinct portion of a frequency band). Similarly, unpaired/paired frequency resources 220-*a*, the unpaired/paired frequency resources 220-*b*, or both may include unpaired frequency resources, such that the uplink and downlink resources share a bandwidth for communications. The use of unpaired and paired frequency resources is further described with respect to FIGS. 3A and 3B.

The unpaired/paired frequency resources 220-*a* may include resources for a transmission from the UE 115-*a* to the network entity 105-*a* in the uplink (e.g., indicated by 'UL' in FIG. 2) direction for the cell 215-*a*. Similarly, the unpaired/paired frequency resources 220-*a* may include resources for a transmission from the network entity 105-*a* to the UE 115-*a* in the downlink (e.g., indicated by 'DL' in FIG. 2) direction for the cell 215-*a*. The resources for the uplink and downlink communication directions may span a bandwidth 225-*a*, which may be a frequency range within the operating band of the cell 215-*a*. Additionally, or alternatively, the unpaired/paired frequency resources 220-*b* may include resources for a transmission from the UE 115-*a* to the network entity 105-*a* in the uplink direction for the cell 215-*b*. Similarly, the unpaired/paired frequency resources 220-*b* may include resources for a transmission from the network entity 105-*a* to the UE 115-*a* in the downlink direction for the cell 215-*b*. The resources for the uplink and downlink communication directions may span a bandwidth 225-*b*, which may be a frequency range within the operating band of the cell 215-*b*.

In some examples, there may be a gap 230 between the unpaired/paired frequency resources 220-*a* and the unpaired/paired frequency resources 220-*b*. In some examples, if the frequency resources for the different cells are a mix of paired and unpaired, the virtual cell group and the gap 230 (e.g., an inner gap) between the cells may be different between each cell, or may partially overlap. The gap 230 may exceed an operating band threshold for the UE 115-*a*. The UE 115-*a*, the network entity 105-*a*, or both may define the operating band threshold within a frequency range (e.g., a first FR1 that may span frequencies from 4.1 GHz to 7.125 GHz, a second FR2 that may span frequencies from 24.25 GHz to 52.6 GHz, or both) based on one or more components of the UE 115-*a* for supporting scheduling across frequency bands in the frequency range. For example, if a frequency difference between an operating band for the cell 215-*a* and an operating band for the cell 215-*b* (e.g., the gap 230) exceeds the operating band threshold, the UE 115-*a* may be unable to support scheduling across both operating bands.

In some examples, to support the scheduling across the operating bands, the network entity 105-*a* may transmit control signaling (e.g., a DCI message) for each cell the UE 115-*a* supports. The scheduling information may schedule one or more shared channel transmissions for the respective cell, such as a physical uplink shared channel (PUSCH)

transmission, a physical downlink shared channel (PDSCH) reception, or both. In some examples, the UE 115-a may support intra-band carrier aggregation, where the carriers are within a same operating band. Additionally, or alternatively, the UE 115-a may support inter-band carrier aggregation, where the carriers are in multiple operating bands. Similarly, the operating bands for each cell may span frequency ranges, such that the cell 215-a may have an operating band in FR1 and the cell 215-b may have an operating band in FR2, or vice-versa. However, transmitting control signaling for each cell may cause high signaling overhead and inefficient resource allocation for communications between the UE 115-a and the network entity 105-a.

In some examples, the network entity 105-a may configure a group of cells at the UE 115-a, such that the network entity 105-a may transmit a single control signal for the group of cells (e.g., rather than for each cell independently). For example, the network entity 105-a may transmit a cell assignment 235 in control signaling, such as RRC signaling, a MAC control element (MAC-CE), downlink control information (DCI), or the like. The cell assignment 235 may assign a cell 215-a, a cell 215-b, or any number of alternative or additional cells to a group of cells, which may be referred to as a virtual cell group, a super cell group, a virtual cell, a super cell, or the like. Once the UE 115-a receives the cell assignment 235 from the network entity 105-a, the network entity 105-a may transmit a control signal (e.g., a DCI message) with information for the virtual cell group. For example, the control signal may include resource allocation information 240 for each cell in the virtual cell group. In some cases, the network entity 105-a and the UE 115-a may support simultaneous scheduling of a maximum number of cells, where the maximum number is configured at the UE 115-a, or otherwise defined at the UE 115-a. The single DCI message may schedule multiple cells (e.g., up to the maximum number of cells) for shared channel communications.

In some cases, the UE 115-a and the network entity 105-a may treat the multiple cells in the virtual cell group (e.g., the cell 215-a and the cell 215-b) as a single cell. Thus, from a radio frequency point of view (e.g., for waveform sharing), the cell 215-a and the cell 215-b may be considered as different carriers or frequency bands, but from a resource allocation point of view, the cell 215-a and the cell 215-b may be considered a virtual cell group. It is noted that while two cells are shown in this example as being part of or assigned to the virtual cell group, any number of cells may be assigned to the virtual cell group. In some cases, the gap 230 may be outside of an operating band threshold (e.g., an operating bandwidth). The network entity 105-a may indicate to the UE 115-a a resource allocation from a common reference point for the cell 215-a and the cell 215-b due to the gap 230 exceeding the operating band threshold. The common reference point may give a resource element index, a RB index, or both on a resource element and RB grid that may be common to the cells in the virtual cell group (e.g., common to the cell 215-a and the cell 215-b).

In some cases, the network entity 105-a may include a resource index in the resource allocation information 240, such that the UE 115-a may determine a subcarrier, a resource element index, a RB index, or the like for a cell 215-a, a cell 215-b, or both. The resource index may be continuous from a lower edge of a lower cell, carrier, or frequency band (lower in frequency) to a higher edge of a higher cell, carrier, or frequency band (higher in frequency). That is, the network entity 105-a may assign a resource element index, RB index, or both for the gap 230. In some other cases, the resource index may be continuous within each cell, carrier, or frequency band, such that if a higher edge of a lower cell, carrier, or frequency band has an index of n, then the lower edge of the higher cell, carrier, or frequency band may have an index of n+1. That is, the network entity 105-a may not assign the resource element index, the RB index, or both for the gap 230. In some examples, the network entity 105-a, the UE 115-a, or both may determine a RB group (RBG), a physical RB group (PRG), or both based on a number of RBs in the virtual cell group.

In some cases, the cells in the group of cells, such as the cell 215-a and the cell 215-b, may have different bandwidths. For example, the cell 215-a may have a bandwidth 225-a, which may be different than a bandwidth 225-b of the cell 215-b. In some examples, the network entity 105-a may configure one or more BWPs for activation at the UE 115-a, which is described in further detail with respect to FIG. 3B. The network entity 105-a may transmit signaling (e.g., an additional signal, or as part of the cell assignment 235) indicating for the UE 115-a to switch from one or more BWPs for cell 215-a and cell 215-b to a BWP for the virtual cell group. At 245, the UE 115-a may perform the BWP switching, such that the UE 115-a may receive the resource allocation information 240 using the updated BWP for the virtual cell group.

In some examples, the resource allocation information 240 may schedule one or more shared channel communications 250 for the cell 215-a, the cell 215-b, and any other cells in the virtual cell group. The resource allocation information 240 may indicate one or more time-frequency resources, such as one or more of the unpaired/paired frequency resources 220-a and the unpaired/paired frequency resources 220-b in the resource diagram 255 for the shared channel communications 250. For example, the resource allocation information 240 may schedule one PDSCH or PUSCH per cell, carrier, or frequency band of the multiple carriers spanned by the virtual cell group. The network entity 105-a may configure the resource allocation information 240 to schedule the one PDSCH or PUSCH based on each cell, carrier, or frequency band having a respective BWP, where a TB may not cross the cell, carrier, or frequency band. For example, the resource allocation information 240 may schedule a PDSCH, a PUSCH, or both for the cell 215-a on the unpaired/paired frequency resources 220-a and a PDSCH, a PUSCH, or both for the cell 215-b on the unpaired/paired frequency resources 220-b. In some other examples, the resource allocation information 240 may schedule a PDSCH or PUSCH per virtual cell group based on the virtual cell group having a respective BWP. The PDSCH or the PUSCH for the virtual cell group may be split into multiple frequency blocks, where a block may be within each cell, carrier, or frequency band. For example, the resource allocation information 240 may schedule a PDSCH, a PUSCH, or both for the virtual cell group, including the cell 215-a and the cell 215-b.

In some examples, the UE 115-a may perform the shared channel communications 250 in accordance with the resource allocation information 240. For example, the UE 115-a may transmit a PUSCH on the uplink unpaired/paired frequency resources 220-a, transmit a PUSCH on the uplink unpaired/paired frequency resources 220-b, receive a PDSCH on the uplink unpaired/paired frequency resources 220-a, receive a PDSCH on the uplink unpaired/paired frequency resources 220-b, or any combination thereof based on the resource allocation information 240.

In some examples, the network entity 105-*a* and the UE 115-*a* may support cancellation of communications for the virtual cell group, such as cancellation of the shared channel communications 250. For example, the network entity 105-*a* may transmit a cancellation indication 260 to cancel one or more shared channel communications 250. The network entity may include the cancellation indication 260 in a DCI message (e.g., a DCI format 2_0 message). The network entity 105-*a* may indicate the cancellation indication 260 in addition to, or within, a slot format indication (SFI) that allocates time resources for the downlink communication direction, the uplink communication direction, or as flexible time resources for either uplink or downlink communication. Based on the SFI and the cancellation indication 260, the UE 115-*a* may cancel transmission or reception of shared channel communications 250. The cancellation indication 260 (e.g., in DCI format 2_4) may indicate for the UE 115-*a* to cancel part of, or an entire, PUSCH or sounding reference signal (SRS) transmission.

In some examples, the network entity 105-*a* may transmit the cancellation indication 260 per cell (e.g., as a block of bits for a cell 215-*a* and a cell 215-*b*) in a DCI format that the UE 115-*a* monitors. That is, the network entity 105-*a* may transmit a cancellation indication 260 per cell or carrier in a virtual cell group, such that a portion of communications for the virtual cell group may be canceled rather than the communications for the entire virtual cell group. For example, the cancellation indication 260 may cancel a portion of a TB for the virtual cell group for the cell 215-*a*, the cell 215-*b*, or both depending on the cancellation indication 260 per cell. If the network entity 105-*a* transmits the cancellation indication for the cell 215-*a*, but not the cell 215-*b*, the UE 115-*a* may cancel the shared channel communications 250 for the cell 215-*a*, but not the cell 215-*b*.

In some other examples, the network entity 105-*a* may transmit the cancellation indication for the virtual cell group. For example, the network entity 105-*a* may include a block of bits in the DCI format that may be configured for the virtual cell group. The block of bits may indicate the cancellation indication 260 for the virtual cell group, which may cancel the shared channel communications 250 for each cell in the virtual cell group (e.g., both the cell 215-*a* and the cell 215-*b*). In some cases, the network entity 105-*a* may transmit the cancellation indication 260 in addition to the resource allocation information 240. In some other cases, the network entity 105-*a* may transmit the cancellation indication 260 instead of the resource allocation information 240.

Figure 3A:
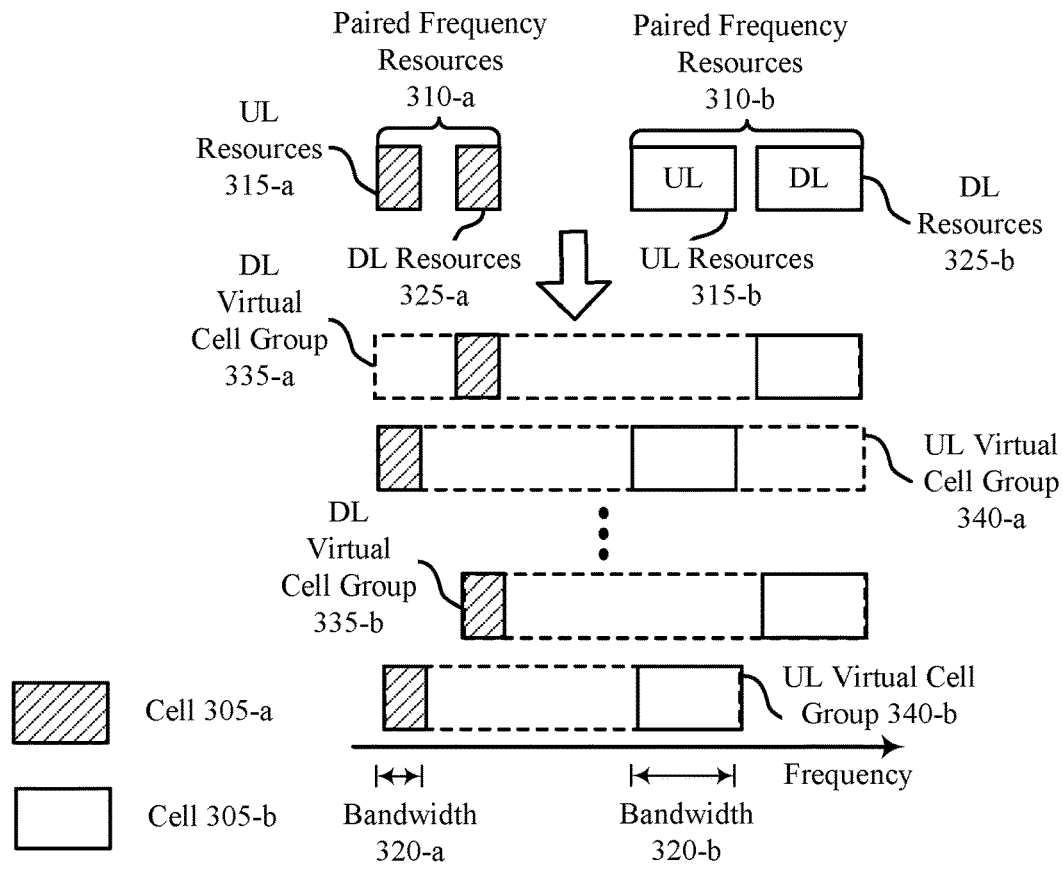
FIGS. 3A and 3B illustrate examples of resource diagrams that support virtual cell grouping for wireless communications in accordance with one or more aspects of the present disclosure.
Figure 3B:
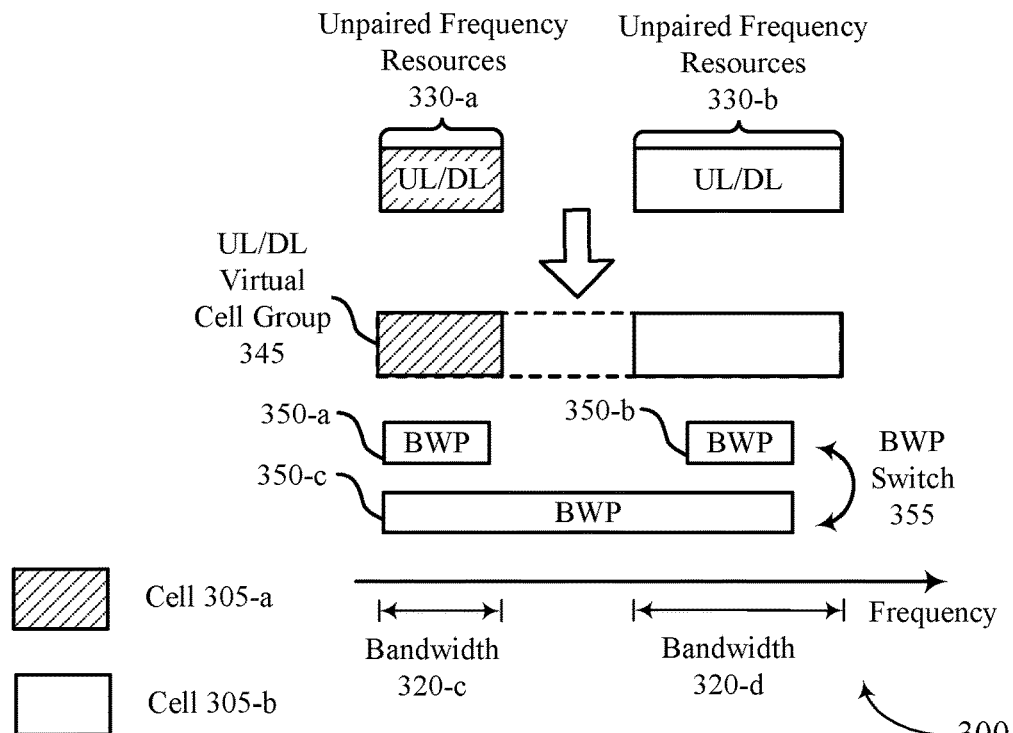

FIGS. 3A and 3B illustrate examples of a resource diagram 300-*a* and a resource diagram 300-*b*, respectively, that support virtual cell grouping for wireless communications in accordance with one or more aspects of the present disclosure. In some examples, the resource diagram 300-*a* and the resource diagram 300-*b* may implement aspects of wireless communications system 100 and wireless communications system 200. For example, the resource diagram 300-*a* and the resource diagram 300-*b* may be implemented by a wireless communications system in which a network entity configures a virtual cell group at a UE, such that the network entity may transmit control signaling for the virtual cell group rather than each cell individually, where the network entity and UE may be examples of the corresponding devices as described with reference to FIGS. 1 and 2.

In some cases, a UE may support communications across multiple cells, each having a different operating band in a radio frequency spectrum band, as described with reference to FIG. 2. For example, the UE 115 may support a cell 305-*a* and a cell 305-*b*, each with a set of frequency resources. As illustrated with respect to FIG. 3A, the set of frequency resources may be paired frequency resources, such as paired frequency resources 310-*a* for the cell 305-*a* and paired frequency resources 310-*b* for the cell 305-*b*. For paired frequency resources, such as the paired frequency resources 310-*a* and the paired frequency resources 310-*b*, an uplink bandwidth may have a defined respective downlink bandwidth (e.g., in a different or distinct portion of a frequency band). For example, the uplink and the downlink bandwidth may each span separate bandwidths. That is, the paired frequency resources 310-*a* for the cell 305-*a* may include uplink resources 315-*a* that span a set of uplink dedicated resources over a bandwidth 320-*a* and downlink resources 325-*a* that span a set of downlink dedicated resources over the bandwidth 320-*a*, or a different bandwidth. Similarly, the paired frequency resources 310-*b* for the cell 305-*b* may include uplink resources 315-*b* that span a set of uplink dedicated resources over a bandwidth 320-*b* and downlink resources 325-*b* that span a set of downlink dedicated resources over the bandwidth 320-*b*, or a different bandwidth.

In some examples, as illustrated with reference to FIG. 3B, the set of frequency resources may be unpaired frequency resources, such as unpaired frequency resources 330-*a* for the cell 305-*a* and unpaired frequency resources 330-*b* for the cell 305-*b*. For unpaired frequency resources, such as the unpaired frequency resources 330-*a* and the unpaired frequency resources 330-*b*, the uplink and downlink resources may share a bandwidth for communications (e.g., in a same portion of a frequency band). For example, the uplink and the downlink bandwidth may each span a same bandwidth. That is, the unpaired frequency resources 330-*a* for the cell 305-*a* may include uplink/downlink resources that may be divided between uplink transmission and downlink reception at a UE over a bandwidth 320-*c*. Similarly, the unpaired frequency resources 330-*b* for the cell 305-*b* may include uplink/downlink resources that may be divided between uplink transmission and downlink reception at a UE over a bandwidth 320-*d*.

In some examples, a network entity may configure a virtual cell group at a UE including the cell 305-*a* and the cell 305-*b*, as described with reference to FIG. 2. Once the virtual cell group is configured, the network entity may transmit resource scheduling information including a resource allocation for the frequency resources. For example, the network entity may configure a downlink virtual cell group 335-*a* or a downlink virtual cell group 335-*b* and an uplink virtual cell group 340-*a* or an uplink virtual cell group 340-*b* at a UE if at least one of the cell 305-*a* or the cell 305-*b* operate in a paired radio frequency spectrum band (e.g., using the paired frequency resources 310-*a*, the paired frequency resources 310-*b*, or both). The downlink virtual cell group 335-*a* and the downlink virtual cell group 335-*b* may include one or more downlink frequency resources, such as the downlink resources 325-*a* for the cell 305-*a* and the downlink resources 325-*b* for the cell 305-*b*. Similarly, the uplink virtual cell group 340-*a* and the uplink virtual cell group 340-*b* may include one or more uplink frequency resources, such as the uplink resources 315-*a* for the cell 305-*a* and the uplink resources 315-*b* for the cell 305-*b*.

In some cases, the downlink virtual cell group 335-*a* may align with the uplink virtual cell group 340-*a*. In some other cases, the downlink virtual cell group 335-*b* may align with an upper and lower edge of the downlink resources 325-*a* and the downlink resources 325-*b*, while the uplink virtual cell group 340-*b* may align with an upper and lower edge of the uplink resources 315-*a* and the uplink resources 315-*b*, respectively. For example, a lower edge of the downlink virtual cell group 335-*b* may align with a lower edge of the downlink resources 325-*a*, a higher edge of the downlink virtual cell group 335-*b* may be aligned with a higher edge of downlink resources 325-*b*, a lower edge of the uplink virtual cell group 340-*b* may align with a lower edge of the uplink resources 315-*a*, and a higher edge of the uplink virtual cell group 340-*b* may align with higher edge of the uplink resources 315-*b*.

In some other examples, the network entity may configure an uplink/downlink virtual cell group 345 at a UE if the cell 305-*a* and the cell 305-*b* operate in an unpaired radio frequency spectrum band (e.g., using the unpaired frequency resources 330-*a* and the unpaired frequency resources 330-*b*). The uplink/downlink virtual cell group 345 may include one or more uplink/downlink frequency resources for the cell 305-*a* and the cell 305-*b*. In some examples, the cells may operate in a mix of paired and unpaired radio frequency spectrum band. For example, the cell 305-*a* may operate in the paired radio frequency spectrum band with the paired frequency resources 310-*a*, while the cell 305-*b* may operate in the unpaired radio frequency spectrum band with the unpaired frequency resources 330-*b*. The network entity may configure the uplink virtual cell group 340-*a* or the uplink virtual cell group 340-*b* with the uplink resources 315-*a* of the paired frequency resources 310-*a* for the cell 305-*a* as well as the uplink/downlink resources of the unpaired frequency resources 330-*b* for the cell 305-*b*. Similarly, the network entity may configure the downlink virtual cell group 335-*a* or the downlink virtual cell group 335-*b* with the downlink resources 325-*a* of the paired frequency resources 310-*a* for the cell 305-*a* as well as the uplink/downlink resources of the unpaired frequency resources 330-*b* for the cell 305-*b*, such that the uplink/downlink resources belong to both the downlink virtual cell group 335-*a* or the downlink virtual cell group 335-*b* and the uplink virtual cell group 340-*a* or the uplink virtual cell group 340-*b*.

In some examples, the network entity may configure a UE with a BWP configuration. For example, the network entity may configure a BWP for each cell, carrier, or frequency band, such that cell 305-*a* may have a BWP 350-*a*, cell 305-*b* may have a BWP 350-*b*, or both. In some other examples, the network entity may configure a BWP for the virtual cell group, rather than per cell, carrier, or frequency band. The cell 305-*a* and the cell 305-*b* in the virtual cell group may share a BWP 350-*c*. In some cases, the network entity may perform PRB indexing during the gap between the higher edge of a BWP in a lower cell and the lower edge of a BWP in a higher cell. For example, the network may perform the indexing between the BWP 350-*a* in a cell 305-*a* and the lower edge of the BWP 350-*b* in a cell 305-*b*, where the cell 305-*b* may have a higher frequency band than the cell 305-*a*. In some other examples, the network entity may skip the gap when performing PRB indexing (e.g., the network entity may not assign any PRB indices to resources that fall within the gap), or the UE may discard scheduling information for any PRB indices to resources that fall within the gap.

In some examples, if the network entity configures a BWP per virtual cell group, such as BWP 350-*c*, then a UE may switch between a BWP per cell, carrier, or frequency band to the BWP per virtual cell group. For example, at 355, the UE may switch between the BWP 350-*a* and the BWP 350-*b* to the BWP 350-*c*. In some examples, switching BWPs at 355 may enable the UE to switch between a TB per cell, carrier, or frequency band, to a TB per virtual cell group, switch between a single DCI for single-cell scheduling to a single DCI for multi-cell scheduling, switch between a per cell activation or deactivation and per virtual cell group activation or deactivation, or any combination thereof. In some examples, the network entity may configure the cells, carriers, or frequency bands involved in the BWP switch (e.g., the network entity may send RRC signaling or other control signaling to configuring the BWP switch). For example, the network entity may configure the cell 305-*a* and the cell 305-*b* to be included in the virtual cell group for the BWP switching. That is, the network entity may semi-statically configure the mapping between the cells, carriers, or frequency bands and a virtual cell group (e.g., a virtual cell group identifier (ID)).

Figure 4:
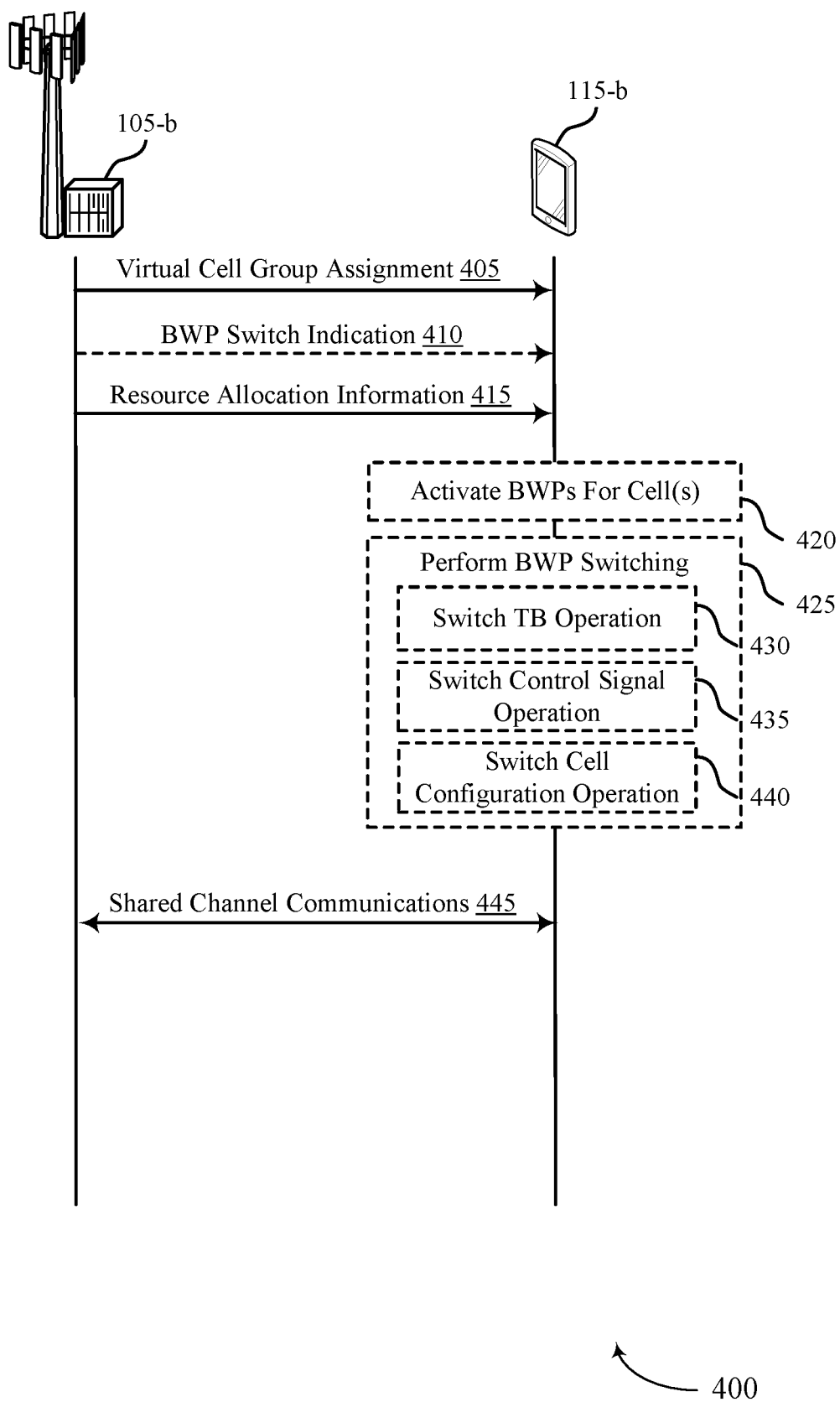
FIGS. 4 and 5 illustrate examples of process flows that support virtual cell grouping for wireless communications in accordance with one or more aspects of the present disclosure.

FIG. 4 illustrates an example of a process flow 400 that supports virtual cell grouping for wireless communications in accordance with one or more aspects of the present disclosure. In some examples, the process flow 400 may implement aspects of wireless communications system 100, wireless communications system 200, resource diagram 300-*a*, and resource diagram 300-*b*. The process flow 400 may illustrate an example of a network entity 105-*b* configuring a virtual cell group at a UE 115-*b*, such that the network entity 105-*b* may transmit control signaling for the virtual cell group rather than individual cells. The network entity 105-*b* and the UE 115-*b* may be examples of a network entity 105 and a UE 115 as described with reference to FIGS. 1 and 2. Alternative examples of the following may be implemented, where some processes are performed in a different order than described or are not performed. In some cases, processes may include additional features not mentioned below, or further processes may be added.

At 405, the network entity 105-*b* may transmit control signaling (e.g., semi-persistent control signaling) indicating one or more cells assigned to a group of cells, which may be referred to as a virtual cell group, a super cell group, a virtual cell, a super cell, or any other name for a group of cells. For example, the network entity 105-*b* may include a first cell and a second cell in the virtual cell group that support communications for the UE 115-*b*. Each cell in the virtual cell group may have a different radio frequency spectrum band. In some cases, a frequency gap between the cells in the virtual cell group may exceed an operating band threshold, as described with reference to FIG. 2. The control signaling including the virtual cell group assignment may include RRC signaling, a MAC-CE, or the like.

At 410, the network entity 105-*b* may transmit a BWP switching indication to the UE 115-*b*. The network entity 105-*b* may transmit the BWP switching indication with the virtual cell group assignment signaling, or independent of the virtual cell group assignment signaling. For example, the network entity 105-*b* may transmit the BWP switching indication in the RRC signaling, the MAC-CE, or the like. In some other examples, the network entity 105-*b* may transmit the BWP switching indication in a DCI message. The BWP switching indication may indicate for the UE 115-*b* to switch from one or more BWPs per cell in the virtual cell group to a BWP for the virtual cell group, as described with reference to FIG. 3B.

At 415, the network entity 105-*b* may transmit resource allocation information for the virtual cell group to the UE 115-*b*. The network entity 105-*b* may transmit the resource allocation information in additional control signaling, such as in a DCI message. The resource allocation information may indicate different sets of resources for shared channels for each cell in the virtual cell group. The shared channels may be PDSCHs, PUSCHS, or both.

In some cases, the resource allocation information may include an indication that one or more indices may be assigned to resources between the frequency gap, where the one or more indices may be non-consecutive between cells in a resource grid for each cell in the virtual cell group. In some other cases, the resource allocation information may indicate that one or more indices in the resource grid are consecutive between the cells in the virtual cell group. In some examples, the resource allocation information may indicate a resource grid that may be common between the cells in the virtual cell group. A resource group size (e.g., a PRB size, a RBG size, or both) may be based on a number of RBs for the virtual cell group. In some other examples, the resource allocation information may indicate one or more gaps between uplink resources and downlink resources for each cell in the virtual cell group.

At 420, the UE 115-b may activate one or more BWPs per cell in the virtual cell group or for the virtual cell group. For example, the UE 115-b may aviate a first BWP for the first cell in the virtual cell group and a second BWP for the second cell in the virtual cell group based on resource allocation information for each cell. The UE 115-b may determine that one or more PRBs for communicating with the network entity 105-b are indexed according to the BWPs. The UE 115-b may select parameters for the BWPs accordingly. In some other examples, the resource allocation information may indicate the first cell and the second cell in the virtual cell groups have sets of unpaired uplink and downlink resources for shared channels. The UE 115-b may activate a BWP for the virtual cell group based on BWP parameters from the resource allocation information. The BWP may have a bandwidth for the first cell and a different bandwidth for the second cell. The UE 115-b may determine the PRBs are indexed according to the cells in the virtual cell group, and may select the BWP parameters for the virtual cell group accordingly.

At 425, the UE 115-b may perform the BWP switching for the cells in accordance with the BWP switching indication. The UE 115-b may receive the resource allocation information based on performing the bandwidth part switching. For example, the UE 115-b may switch from a BWP per cell to a BWP for the virtual cell group, and may receive the resource allocation information for the virtual cell group based on switching. In some cases, at 430, the UE 115-b may switch a TB operation from a first operation with a TB per cell in the virtual cell group and a second operation with the TB for the virtual cell group based on performing the BWP switching. Additionally, or alternatively, at 435, the UE 115-b may switch a control signal operation from a first operation with a control signal per cell in the virtual cell group and a second operation with the control signal for the virtual cell group based on performing the BWP switching. In some examples, at 440, the UE 115-b may switch a cell configuration operation from a first operation with a configuration for first communications per cell in the virtual cell group and a second operation with the configuration for second communications for the virtual cell group based on performing the BWP switching.

At 445, the UE 115-b and the network entity 105-b may communicate one or more shared channels via the cells of the virtual cell group using the resources indicated in the resource allocation information. For example, the UE 115-b and the network entity 105-b may communicate a TB per cell or a portion of TB per cell in the virtual cell group. In some cases, the UE 115-b may receive a signal, or signaling, using one or more cells of the virtual cell group. In some other cases, the UE 115-b may transmit a signal, or signaling, using one or more cells of the virtual cell group.

In some examples, if the virtual cell group assignment indicates that the cells support a downlink communication direction, the UE 115-b may receive a signal, or signaling, using the virtual cell group resource allocation information. The UE 115-b may receive additional control signaling indicating a resource allocation for a cell excluded from the virtual cell group, and may transmit an additional signal using the cell.

In some cases, the cells in the virtual cell group may support a downlink communication direction and a subset of the cells in the virtual cell group may support an uplink communication direction.

Figure 5:
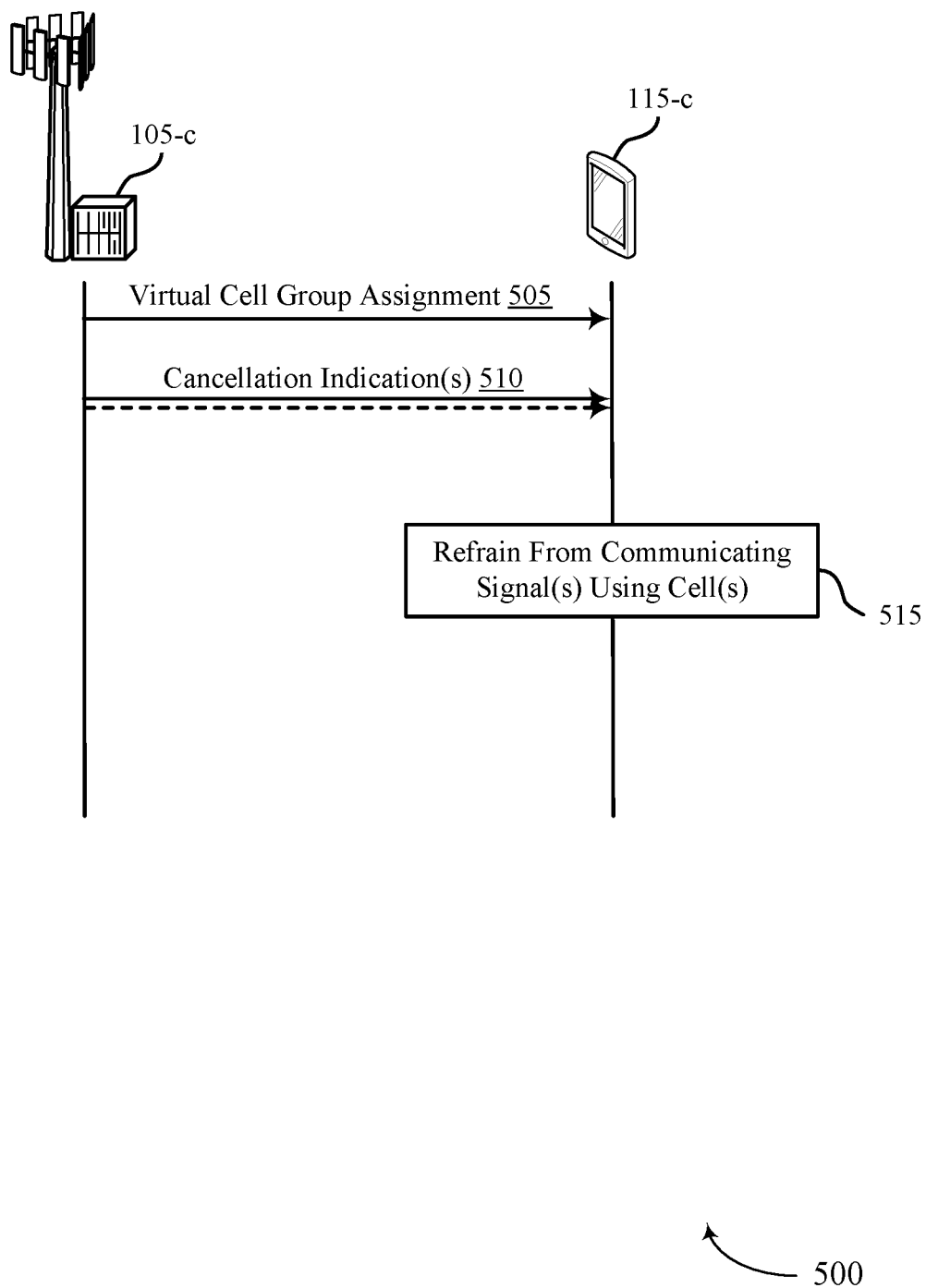

FIG. 5 illustrates an example of a process flow 500 that supports virtual cell grouping for wireless communications in accordance with one or more aspects of the present disclosure. In some examples, the process flow 500 may implement aspects of wireless communications system 100, wireless communications system 200, resource diagram 300-a, and resource diagram 300-b. The process flow 500 may illustrate an example of a network entity 105-c configuring a virtual cell group at a UE 115-c, and cancelling communications on one or more cells of the virtual cell group. The network entity 105-c and the UE 115-c may be examples of a network entity 105 and a UE 115 as described with reference to FIGS. 1 and 2. Alternative examples of the following may be implemented, where some processes are performed in a different order than described or are not performed. In some cases, processes may include additional features not mentioned below, or further processes may be added.

At 505, the network entity 105-c may transmit control signaling (e.g., semi-persistent control signaling) indicating one or more cells assigned to a group of cells, which may be referred to as a virtual cell group, a super cell group, a virtual cell, a super cell, or any other name for a group of cells. For example, the network entity 105-c may include a first cell and a second cell in the virtual cell group that support communications for the UE 115-c. Each cell in the virtual cell group may have a different radio frequency spectrum band. In some cases, a frequency gap between the cells in the virtual cell group may exceed an operating band threshold, as described with reference to FIG. 2. The control signaling including the virtual cell group assignment may include RRC signaling, a MAC-CE, or the like.

At 510, the network entity 105-c may transmit additional control signaling to the UE 115-c, such as a DCI message, including a cancellation indication for the virtual cell group. The cancellation indication may cancel communications during a set of time resources for the cells in the cell group (e.g., the first cell, the second cell, or both). In some examples, the network entity 105-c may transmit respective cancellation indications for different cells in the virtual cell group. In some other examples, the network entity 105-c may transmit a single cancellation indication for the cells assigned to the virtual cell group.

At 515, the UE 115-c may refrain from communicating one or more signals using one or more cells of the virtual cell group (e.g., the first cell, the second cell, or both) during the set of time resources and in accordance with the cancellation indication. In some examples, the UE 115-c may determine the set of time resources span a portion of a TB or an entire TB. The UE 115-c may refrain from communicating during the portion of the TB or during the entire TB, respectively.

Figure 6:
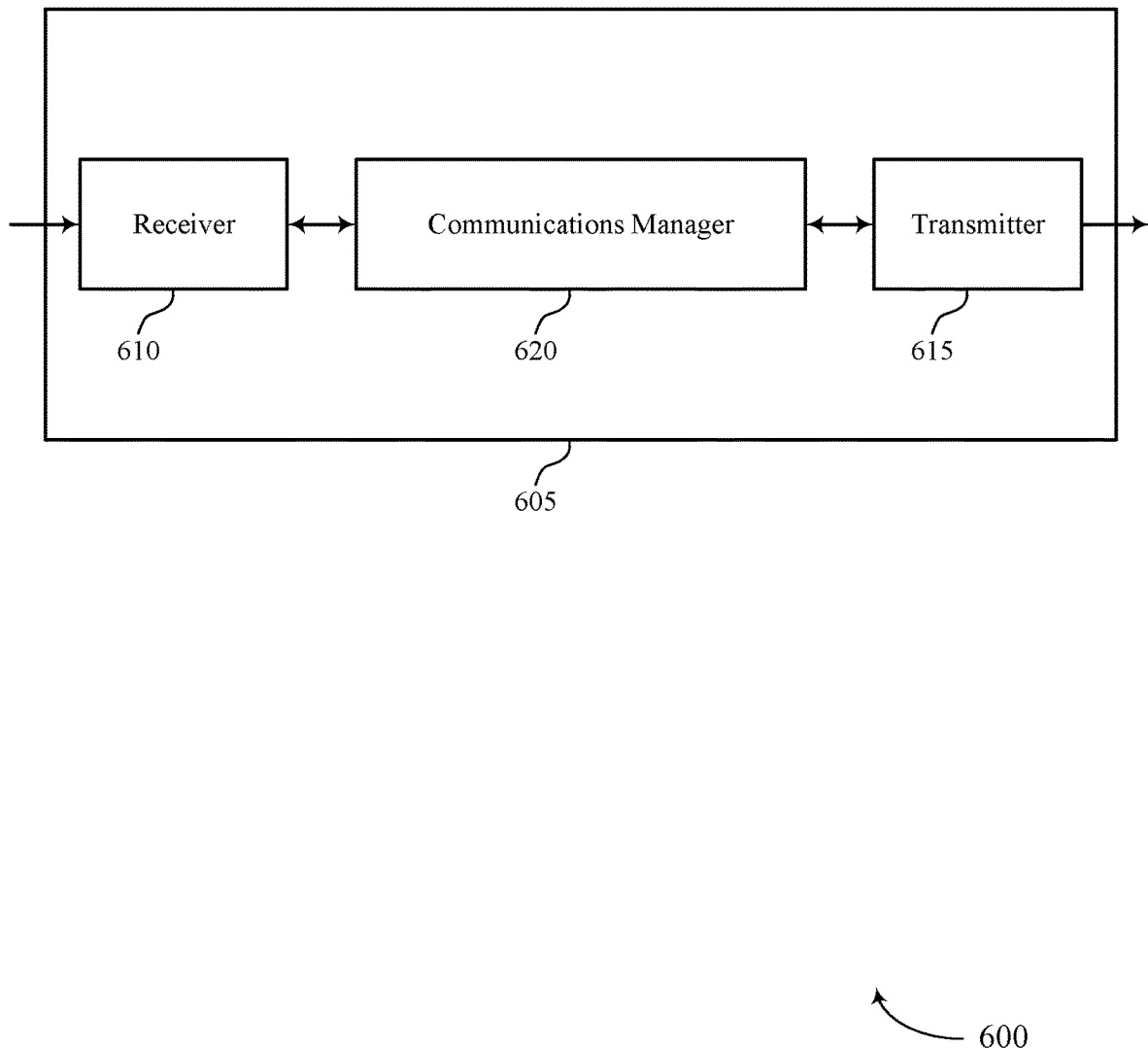
FIGS. 6 and 7 show block diagrams of devices that support virtual cell grouping for wireless communications in accordance with one or more aspects of the present disclosure.

FIG. 6 shows a block diagram 600 of a device 605 that supports virtual cell grouping for wireless communications in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to virtual cell grouping for wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to virtual cell grouping for wireless communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of virtual cell grouping for wireless communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold. The communications manager 620 may be configured as or otherwise support a means for receiving a second control signal that indicates resource allocation information for the virtual cell group, the resource allocation information indicating a first set of resource allocation information for a first shared channel for the first cell and a second set of resource allocation information for a second shared channel for the second cell. The communications manager 620 may be configured as or otherwise support a means for communicating the first shared channel via the first cell based on the first set of resource allocation information and the second shared channel via the second cell based on the second set of resource allocation information.

Additionally, or alternatively, the communications manager 620 may support wireless communication at a UE in accordance with examples as disclosed herein. For example, the communications manager 620 may be configured as or otherwise support a means for receiving a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold. The communications manager 620 may be configured as or otherwise support a means for receiving a second control signal including a cancellation indication for the virtual cell group, the cancellation indication indicating a cancellation of the communications during a set of time resources associated with the first cell and the second cell. The communications manager 620 may be configured as or otherwise support a means for refraining from communicating one or more signals using the first cell, the second cell, or both during the set of time resources based on the cancellation indication.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for signaling that configures a UE 115 with a virtual cell group, such that a network entity 105 may transmit additional signaling for the virtual cell group rather than each individual cell, which may provide for reduced processing, reduced power consumption, more efficient utilization of communication resources, and the like.

Figure 7:
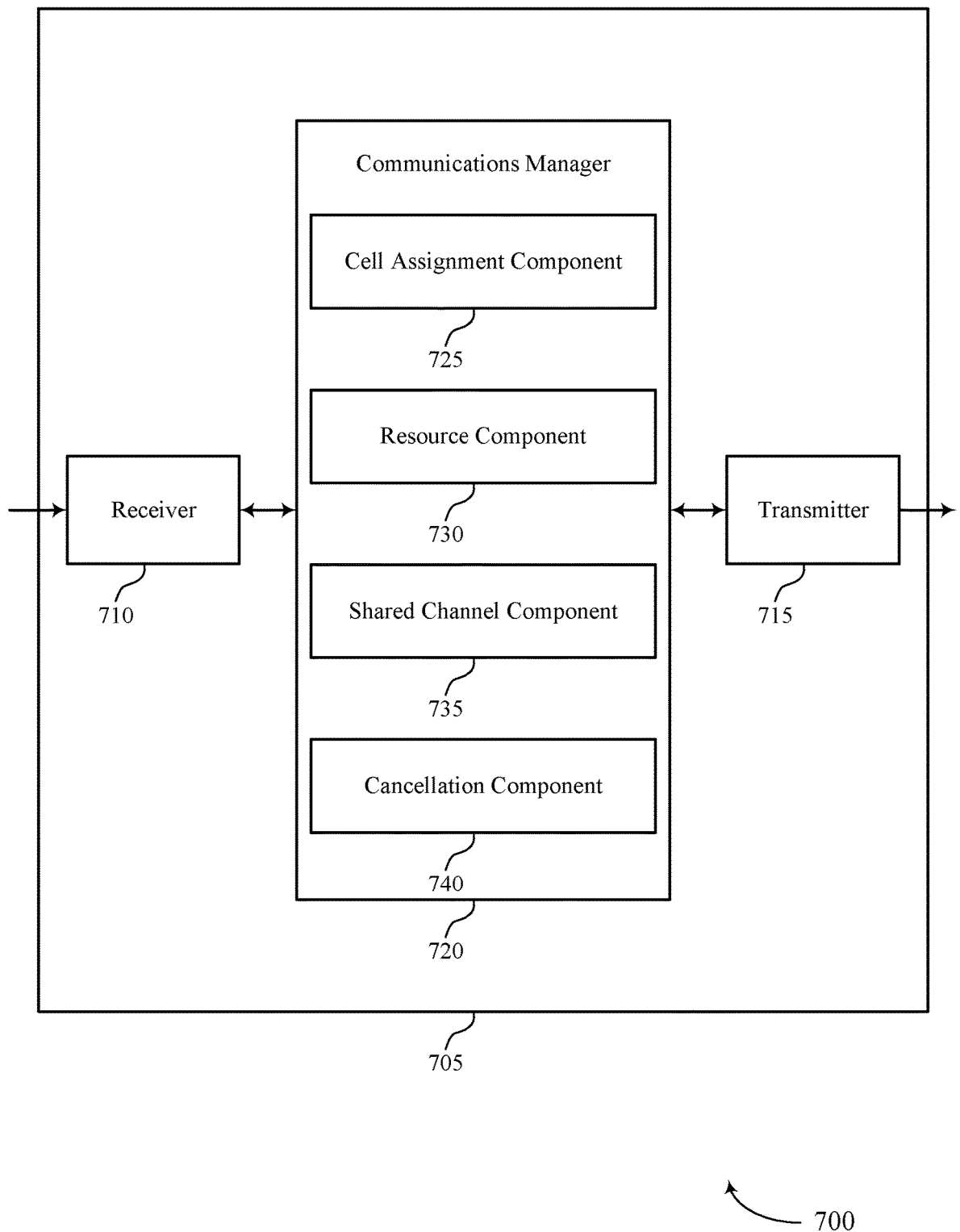

FIG. 7 shows a block diagram 700 of a device 705 that supports virtual cell grouping for wireless communications in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to virtual cell grouping for wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to virtual cell grouping for wireless communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of virtual cell grouping for wireless communications as described herein. For example, the communications manager 720 may include a cell assignment component 725, a resource component 730, a shared channel component 735, a cancellation component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The cell assignment component 725 may be configured as or otherwise support a means for receiving a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold. The resource component 730 may be configured as or otherwise support a means for receiving a second control signal that indicates resource allocation information for the virtual cell group, the resource allocation information indicating a first set of resource allocation information for a first shared channel for the first cell and a second set of resource allocation information for a second shared channel for the second cell. The shared channel component 735 may be configured as or otherwise support a means for communicating the first shared channel via the first cell based on the first set of resource allocation information and the second shared channel via the second cell based on the second set of resource allocation information.

Additionally, or alternatively, the communications manager 720 may support wireless communication at a UE in accordance with examples as disclosed herein. The cell assignment component 725 may be configured as or otherwise support a means for receiving a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold. The cancellation component 740 may be configured as or otherwise support a means for receiving a second control signal including a cancellation indication for the virtual cell group, the cancellation indication indicating a cancellation of the communications during a set of time resources associated with the first cell and the second cell. The shared channel component 735 may be configured as or otherwise support a means for refraining from communicating one or more signals using the first cell, the second cell, or both during the set of time resources based on the cancellation indication.

Figure 8:
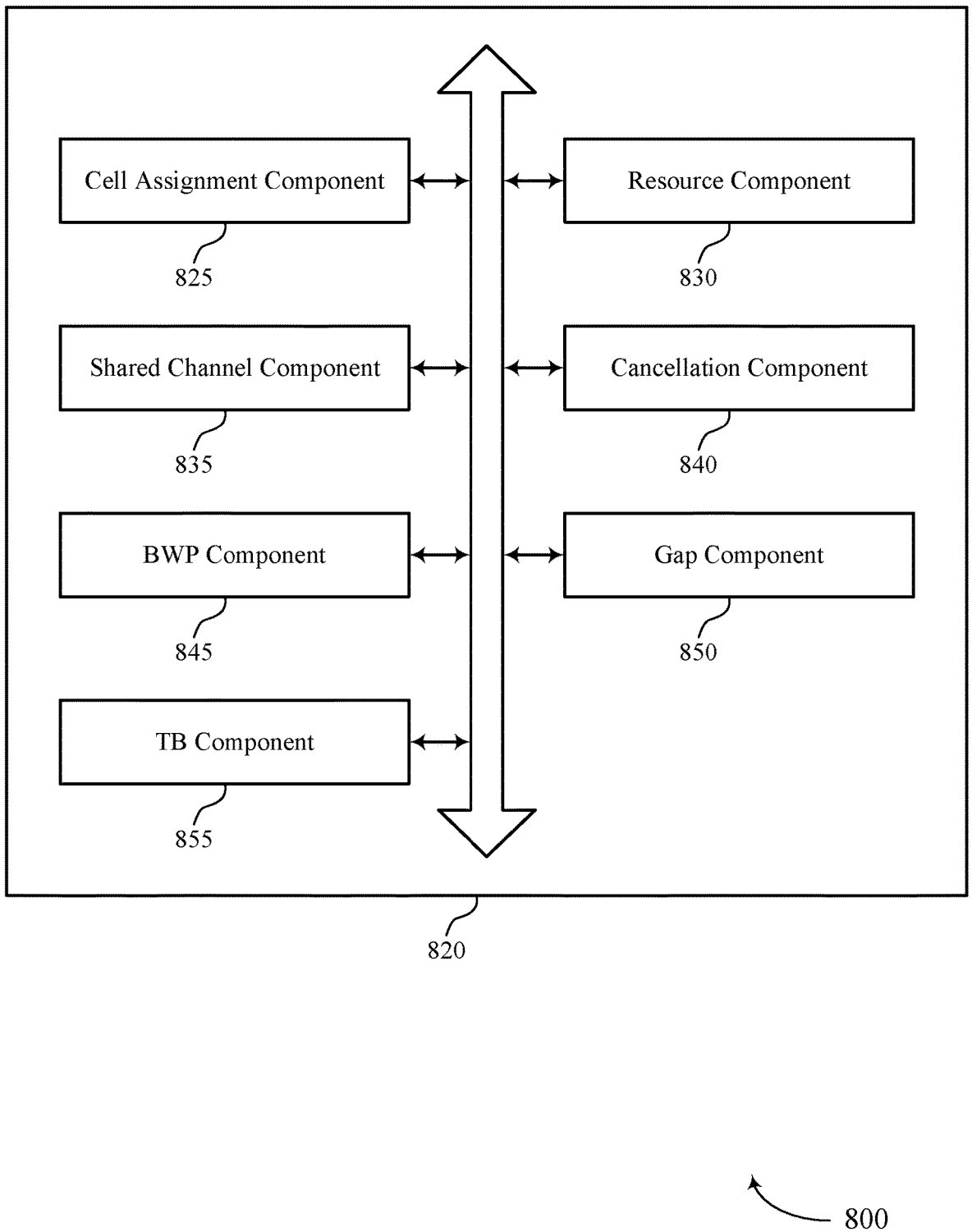
FIG. 8 shows a block diagram of a communications manager that supports virtual cell grouping for wireless communications in accordance with one or more aspects of the present disclosure.

FIG. 8 shows a block diagram 800 of a communications manager 820 that supports virtual cell grouping for wireless communications in accordance with one or more aspects of the present disclosure. The communications manager 820 may be an example of aspects of a communications manager 620, a communications manager 720, or both, as described herein. The communications manager 820, or various components thereof, may be an example of means for performing various aspects of virtual cell grouping for wireless communications as described herein. For example, the communications manager 820 may include a cell assignment component 825, a resource component 830, a shared channel component 835, a cancellation component 840, a BWP component 845, a gap component 850, a TB component 855, or any combination thereof. Each of these components may communicate, directly or indirectly, with one another (e.g., via one or more buses).

The communications manager 820 may support wireless communication at a UE in accordance with examples as disclosed herein. The cell assignment component 825 may be configured as or otherwise support a means for receiving a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold. The resource component 830 may be configured as or otherwise support a means for receiving a second control signal that indicates resource allocation information for the virtual cell group, the resource allocation information indicating a first set of resource allocation information for a first shared channel for the first cell and a second set of resource allocation information for a second shared channel for the second cell. The shared channel component 835 may be configured as or otherwise support a means for communicating the first shared channel via the first cell based on the first set of resource allocation information and the second shared channel via the second cell based on the second set of resource allocation information.

In some examples, to support receiving the second control signal, the resource component 830 may be configured as or otherwise support a means for receiving an indication that one or more first indices in a resource grid corresponding to the virtual cell group and one or more second indices in the resource grid corresponding to the virtual cell group are non-consecutive between the first cell and the second cell, where the resource allocation information indicates that one or more indices are assigned to resources associated with the frequency gap.

In some examples, to support receiving the second control signal, the resource component 830 may be configured as or otherwise support a means for receiving an indication that one or more first indices in a resource grid corresponding to the virtual cell group and one or more second indices in the resource grid corresponding to the virtual cell group are consecutive between the first cell and the second cell.

In some examples, to support receiving the second control signal, the resource component 830 may be configured as or otherwise support a means for receiving an indication of a resource grid that is common between the first cell and the second cell, where a resource group size associated with the resource allocation information is based on a number of RBs associated with the virtual cell group.

In some examples, receiving a third control signal that indicates for the UE to switch from one or more second BWPs per cell in the virtual cell group to the first BWP. In some examples, performing the BWP switching for the set of multiple cells in accordance with the third control signal, where receiving the second control signal is based on performing the BWP switching.

In some examples, the TB component 855 may be configured as or otherwise support a means for switching a TB operation from a first operation with a TB per cell in the virtual cell group and a second operation with the TB for the virtual cell group based on performing the BWP switching.

In some examples, the BWP component 845 may be configured as or otherwise support a means for switching a control signal operation from a first operation with a control signal per cell in the virtual cell group and a second operation with the control signal for the virtual cell group based on performing the BWP switching.

In some examples, the BWP component 845 may be configured as or otherwise support a means for switching a cell configuration operation from a first operation with a configuration for first communications per cell in the virtual cell group and a second operation with the configuration for second communications for the virtual cell group based on performing the BWP switching.

In some examples, to support receiving the second control signal, the gap component 850 may be configured as or otherwise support a means for receiving an indication of a first gap between a first uplink resource and a first downlink resource associated with the first cell and of a second gap between a second uplink resource and a second downlink resource associated with the second cell.

In some examples, the BWP component 845 may be configured as or otherwise support a means for activating a first BWP for the first cell based on the first set of resource allocation information. In some examples, the BWP component 845 may be configured as or otherwise support a means for activating a second BWP for the second cell based on the second set of resource allocation information.

In some examples, the resource component 830 may be configured as or otherwise support a means for determining that a set of multiple physical RBs for the communicating are indexed according to the first BWP and the second BWP.

In some examples, the BWP component 845 may be configured as or otherwise support a means for selecting one or more parameters for the first BWP for the first cell and the second BWP for the second cell based on the determining.

In some examples, the first set of resource allocation information indicates a first set of unpaired uplink and downlink resources for the first shared channel and the second set of resource allocation information indicates a second set of unpaired uplink and downlink resources for the second shared channel, and the BWP component 845 may be configured as or otherwise support a means for activating a BWP for the virtual cell group based on a set of BWP parameters determined based on the resource allocation information, the BWP corresponding to a first bandwidth for the first cell and corresponding to a second bandwidth for the second cell.

In some examples, the resource component 830 may be configured as or otherwise support a means for determining a set of multiple physical RBs for the communicating are indexed according to the first cell and the second cell. In some examples, the BWP component 845 may be configured as or otherwise support a means for selecting the set of BWP parameters for the virtual cell group based on the determining.

In some examples, to support communicating, the TB component 855 may be configured as or otherwise support a means for communicating a first TB using the first cell and a second TB using the second cell.

In some examples, to support communicating, the TB component 855 may be configured as or otherwise support a means for communicating a first portion of a TB associated with the virtual cell group using the first cell and a second portion of the TB using the second cell.

In some examples, to support communicating, the shared channel component 835 may be configured as or otherwise support a means for receiving a signal using the first cell based on the first set of resource allocation information, using the second cell based on the second set of resource allocation information, or both.

In some examples, to support communicating, the shared channel component 835 may be configured as or otherwise support a means for transmitting a signal using the first cell based on the first set of resource allocation information, using the second cell based on the second set of resource allocation information, or both.

In some examples, the first control signal indicates that the set of multiple cells correspond to a downlink communication direction, and the shared channel component 835 may be configured as or otherwise support a means for receiving a first signal using the first cell based on the first set of resource allocation information, using the second cell based on the second set of resource allocation information, or both. In some examples, the first control signal indicates that the set of multiple cells correspond to a downlink communication direction, and the resource component 830 may be configured as or otherwise support a means for receiving a third control signal that indicates additional resource allocation information for a third cell, where the third cell is excluded from the virtual cell group. In some examples, the first control signal indicates that the set of multiple cells correspond to a downlink communication direction, and the shared channel component 835 may be configured as or otherwise support a means for transmitting a second signal using the third cell based on the additional resource allocation information.

In some examples, the set of multiple cells in the virtual cell group are associated with a downlink communication direction and a subset of cells of the set of multiple cells in the virtual cell group are associated with an uplink communication direction.

In some examples, the first control signal includes a RRC signal.

In some examples, the second control signal includes a DCI message.

Additionally, or alternatively, the communications manager 820 may support wireless communication at a UE in accordance with examples as disclosed herein. In some examples, the cell assignment component 825 may be configured as or otherwise support a means for receiving a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold. The cancellation component 840 may be configured as or otherwise support a means for receiving a second control signal including a cancellation indication for the virtual cell group, the cancellation indication indicating a cancellation of the communications during a set of time resources associated with the first cell and the second cell. In some examples, the shared channel component 835 may be configured as or otherwise support a means for refraining from communicating one or more signals using the first cell, the second cell, or both during the set of time resources based on the cancellation indication.

In some examples, to support receiving the second control signal, the cancellation component 840 may be configured as or otherwise support a means for receiving a respective cancellation indication for the first cell and the second cell.

In some examples, to support receiving the second control signal, the cancellation component 840 may be configured as or otherwise support a means for receiving the cancellation indication for the set of multiple cells assigned to the virtual cell group.

In some examples, the TB component 855 may be configured as or otherwise support a means for determining the set of time resources span a portion of a TB. In some examples, the TB component 855 may be configured as or otherwise support a means for refraining from communicating the one or more signals during the portion of the TB.

In some examples, the TB component 855 may be configured as or otherwise support a means for determining the set of time resources span a TB. In some examples, the TB component 855 may be configured as or otherwise support a means for refraining from communicating the one or more signals during the TB.

Figure 9:
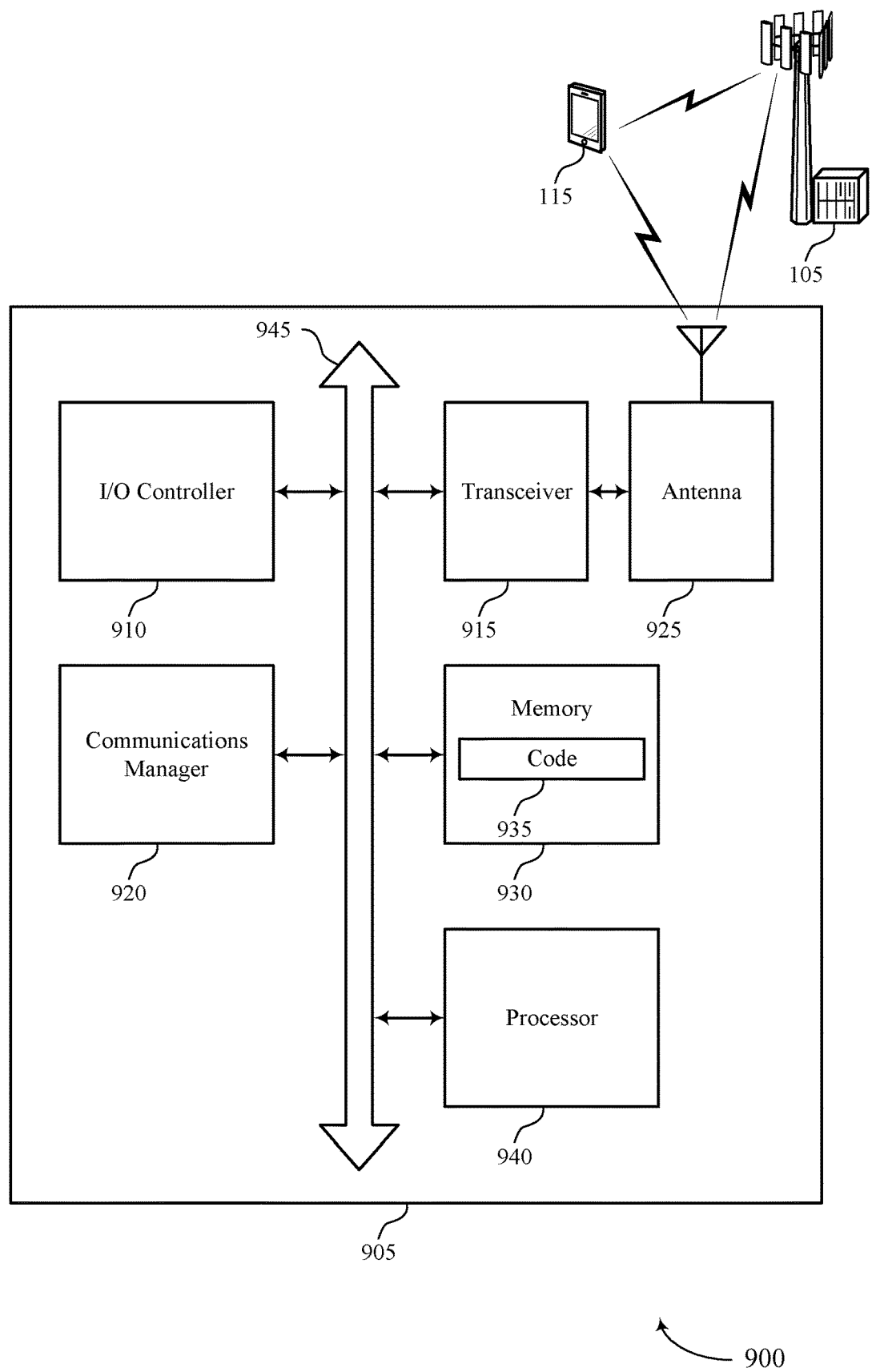
FIG. 9 shows a diagram of a system including a device that supports virtual cell grouping for wireless communications in accordance with one or more aspects of the present disclosure.

FIG. 9 shows a diagram of a system 900 including a device 905 that supports virtual cell grouping for wireless communications in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting virtual cell grouping for wireless communications). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold. The communications manager 920 may be configured as or otherwise support a means for receiving a second control signal that indicates resource allocation information for the virtual cell group, the resource allocation information indicating a first set of resource allocation information for a first shared channel for the first cell and a second set of resource allocation information for a second shared channel for the second cell. The communications manager 920 may be configured as or otherwise support a means for communicating the first shared channel via the first cell based on the first set of resource allocation information and the second shared channel via the second cell based on the second set of resource allocation information.

Additionally, or alternatively, the communications manager 920 may support wireless communication at a UE in accordance with examples as disclosed herein. For example, the communications manager 920 may be configured as or otherwise support a means for receiving a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold. The communications manager 920 may be configured as or otherwise support a means for receiving a second control signal including a cancellation indication for the virtual cell group, the cancellation indication indicating a cancellation of the communications during a set of time resources associated with the first cell and the second cell. The communications manager 920 may be configured as or otherwise support a means for refraining from communicating one or more signals using the first cell, the second cell, or both during the set of time resources based on the cancellation indication.

By including or configuring the communications manager 920 in accordance with examples as described herein, the device 905 may support techniques for signaling that configures a UE 115 with a virtual cell group, such that a network entity 105 may transmit additional signaling for the virtual cell group rather than each individual cell, which may provide for improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of virtual cell grouping for wireless communications as described herein, or the processor 940 and the memory 930 may be otherwise configured to perform or support such operations.

Figure 10:
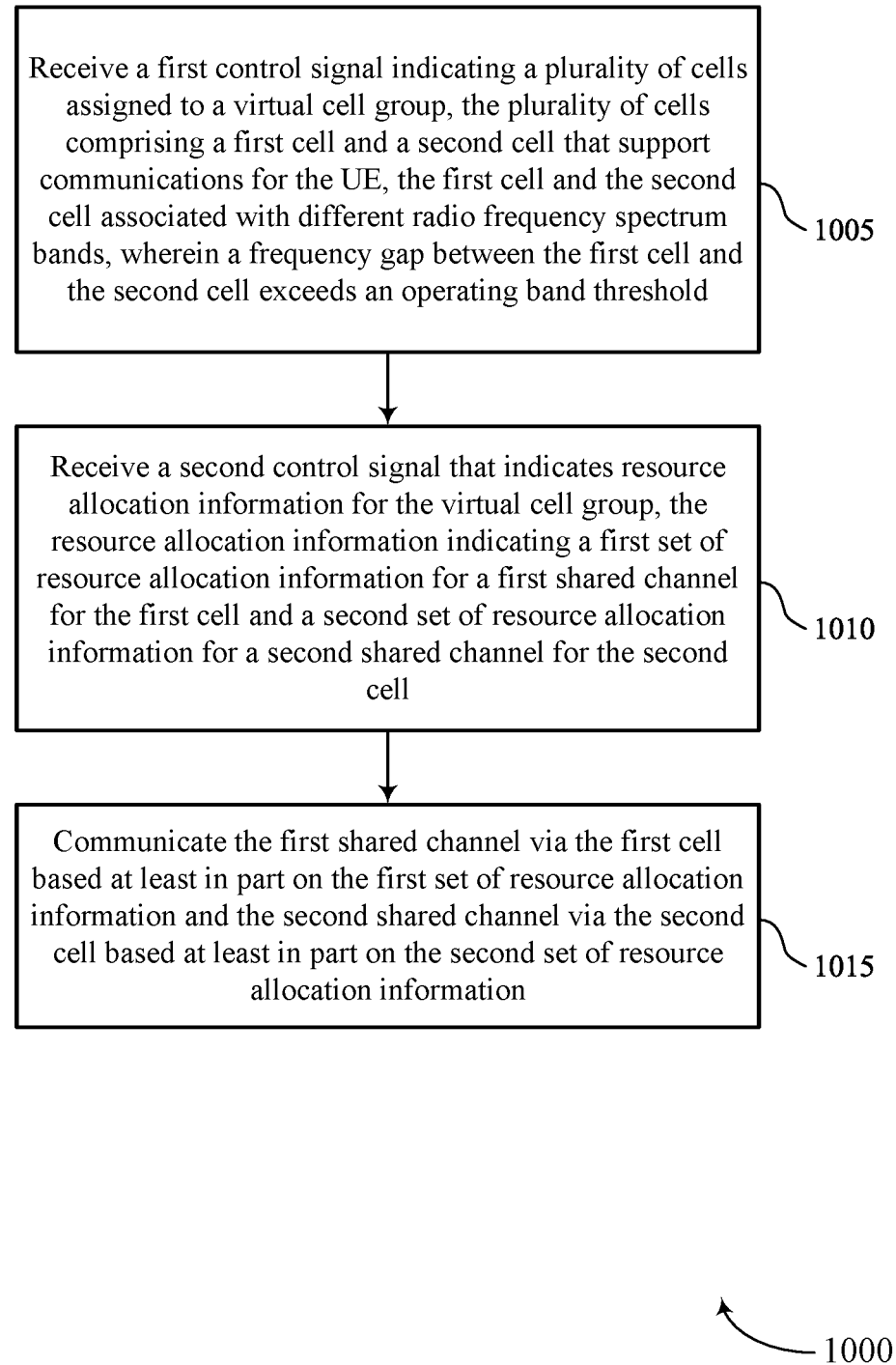
FIGS. 10 through 15 show flowcharts illustrating methods that support virtual cell grouping for wireless communications in accordance with one or more aspects of the present disclosure.

FIG. 10 shows a flowchart illustrating a method 1000 that supports virtual cell grouping for wireless communications in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include receiving a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold. The operations of 1005 may be performed in accordance with examples as disclosed herein. In some examples, aspects of the operations of 1005 may be performed by a cell assignment component 825 as described with reference to FIG. 8.

At 1010, the method may include receiving a second control signal that indicates resource allocation information for the virtual cell group, the resource allocation information indicating a first set of resource allocation information for a first shared channel for the first cell and a second set of resource allocation information for a second shared channel for the second cell. The operations of 1010 may be performed in accordance with examples as disclosed herein. In some examples, aspects of the operations of 1010 may be performed by a resource component 830 as described with reference to FIG. 8.

At 1015, the method may include communicating the first shared channel via the first cell based on the first set of resource allocation information and the second shared channel via the second cell based on the second set of resource allocation information. The operations of 1015 may be performed in accordance with examples as disclosed herein. In some examples, aspects of the operations of 1015 may be performed by a shared channel component 835 as described with reference to FIG. 8.

Figure 11:
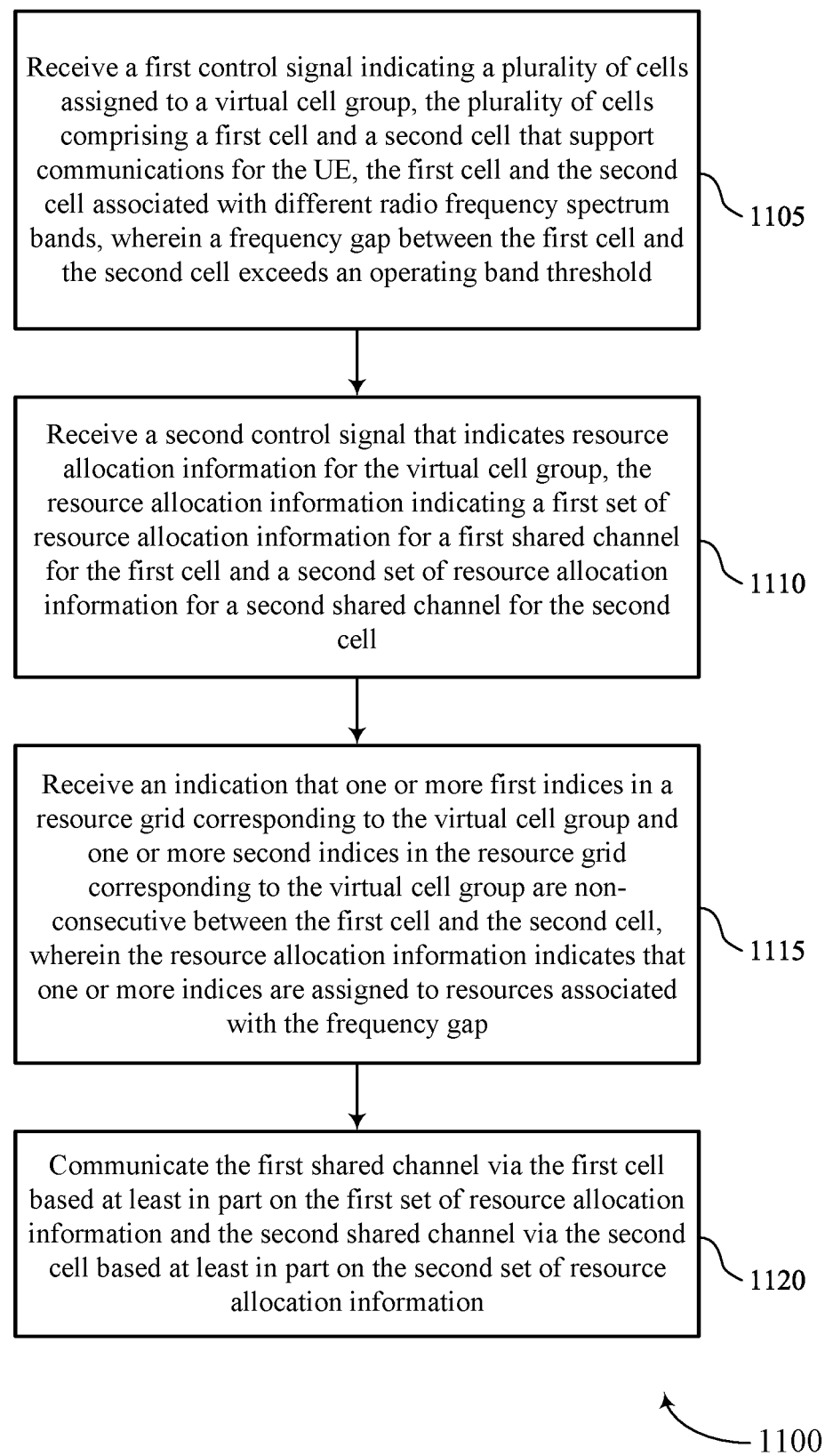

FIG. 11 shows a flowchart illustrating a method 1100 that supports virtual cell grouping for wireless communications in accordance with one or more aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include receiving a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold. The operations of 1105 may be performed in accordance with examples as disclosed herein. In some examples, aspects of the operations of 1105 may be performed by a cell assignment component 825 as described with reference to FIG. 8.

At 1110, the method may include receiving a second control signal that indicates resource allocation information for the virtual cell group, the resource allocation information indicating a first set of resource allocation information for a first shared channel for the first cell and a second set of resource allocation information for a second shared channel for the second cell. The operations of 1110 may be performed in accordance with examples as disclosed herein. In some examples, aspects of the operations of 1110 may be performed by a resource component 830 as described with reference to FIG. 8.

At 1115, the method may include receiving an indication that one or more first indices in a resource grid corresponding to the virtual cell group and one or more second indices in the resource grid corresponding to the virtual cell group are non-consecutive between the first cell and the second cell, where the resource allocation information indicates that one or more indices are assigned to resources associated with the frequency gap. The operations of 1115 may be performed in accordance with examples as disclosed herein. In some examples, aspects of the operations of 1115 may be performed by a resource component 830 as described with reference to FIG. 8.

At 1120, the method may include communicating the first shared channel via the first cell based on the first set of resource allocation information and the second shared channel via the second cell based on the second set of resource allocation information. The operations of 1120 may be performed in accordance with examples as disclosed herein. In some examples, aspects of the operations of 1120 may be performed by a shared channel component 835 as described with reference to FIG. 8.

Figure 12:
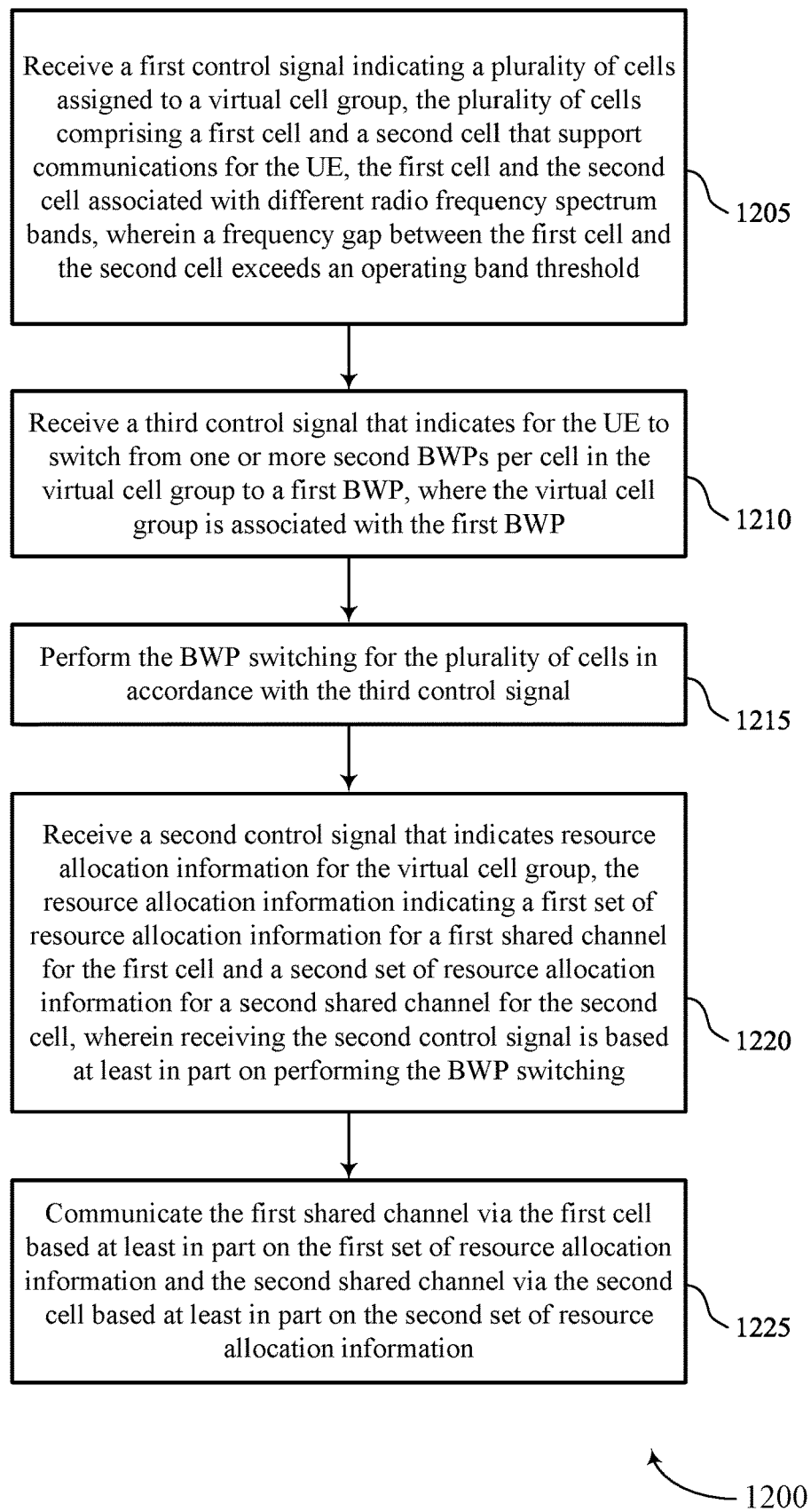

FIG. 12 shows a flowchart illustrating a method 1200 that supports virtual cell grouping for wireless communications in accordance with one or more aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include receiving a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold. The operations of 1205 may be performed in accordance with examples as disclosed herein. In some examples, aspects of the operations of 1205 may be performed by a cell assignment component 825 as described with reference to FIG. 8.

At 1210, the method may include receiving a third control signal that indicates for the UE to switch from one or more second BWPs per cell in the virtual cell group to a first BWP, where the virtual cell group is associated with the first BWP. The operations of 1210 may be performed in accordance with examples as disclosed herein. In some examples, aspects of the operations of 1210 may be performed by a BWP component 845 as described with reference to FIG. 8.

At 1215, the method may include performing the BWP switching for the set of multiple cells in accordance with the third control signal. The operations of 1215 may be performed in accordance with examples as disclosed herein. In some examples, aspects of the operations of 1215 may be performed by a BWP component 845 as described with reference to FIG. 8.

At 1220, the method may include receiving a second control signal that indicates resource allocation information for the virtual cell group, the resource allocation information indicating a first set of resource allocation information for a first shared channel for the first cell and a second set of resource allocation information for a second shared channel for the second cell, where receiving the second control signal is based on performing the BWP switching. The operations of 1220 may be performed in accordance with examples as disclosed herein. In some examples, aspects of the operations of 1220 may be performed by a resource component 830 as described with reference to FIG. 8.

At 1225, the method may include communicating the first shared channel via the first cell based on the first set of resource allocation information and the second shared channel via the second cell based on the second set of resource allocation information. The operations of 1225 may be performed in accordance with examples as disclosed herein. In some examples, aspects of the operations of 1225 may be performed by a shared channel component 835 as described with reference to FIG. 8.

Figure 13:
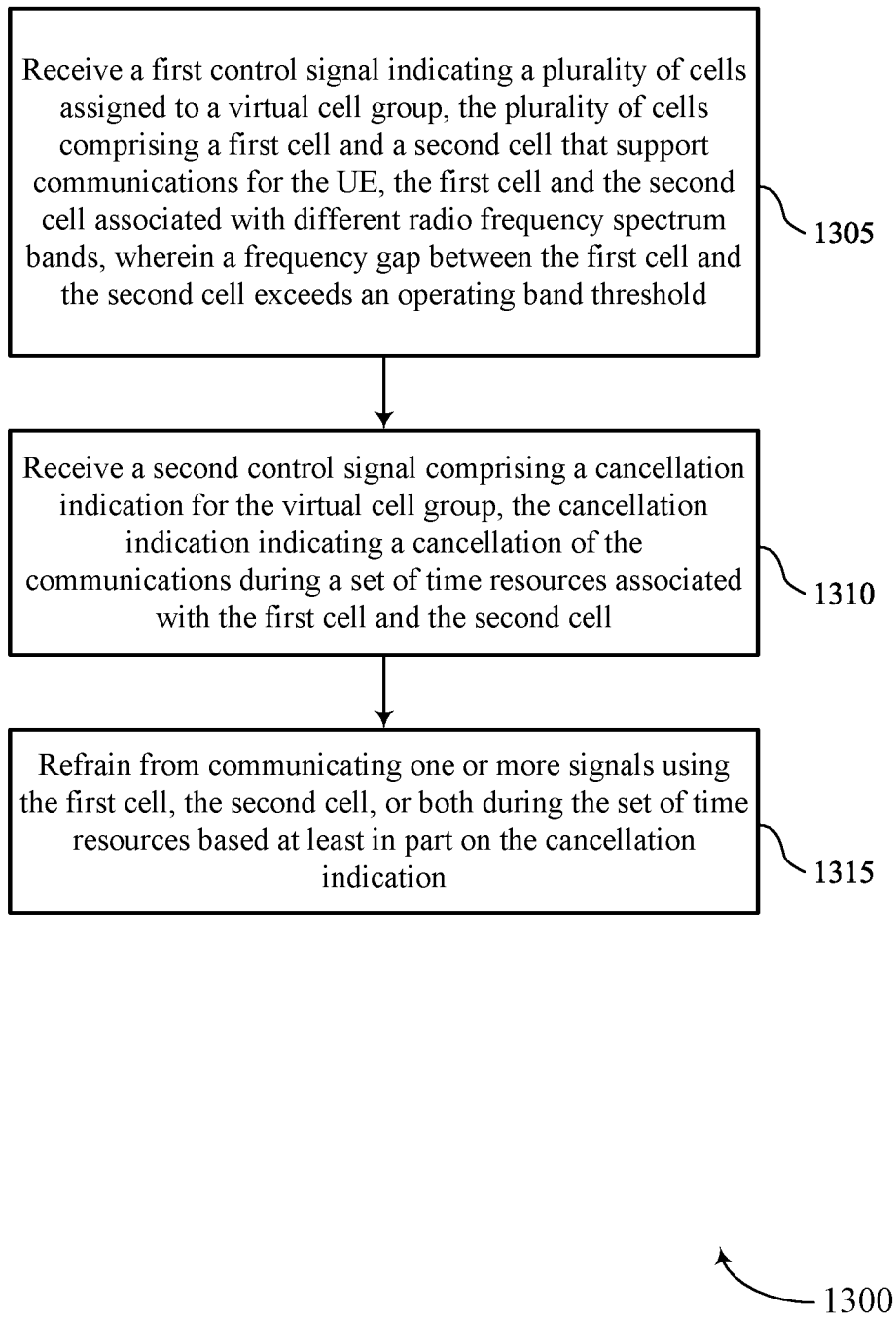

FIG. 13 shows a flowchart illustrating a method 1300 that supports virtual cell grouping for wireless communications in accordance with one or more aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1305, the method may include receiving a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold. The operations of 1305 may be performed in accordance with examples as disclosed herein. In some examples, aspects of the operations of 1305 may be performed by a cell assignment component 825 as described with reference to FIG. 8.

At 1310, the method may include receiving a second control signal including a cancellation indication for the virtual cell group, the cancellation indication indicating a cancellation of the communications during a set of time resources associated with the first cell and the second cell. The operations of 1310 may be performed in accordance with examples as disclosed herein. In some examples, aspects of the operations of 1310 may be performed by a cancellation component 840 as described with reference to FIG. 8.

At 1315, the method may include refraining from communicating one or more signals using the first cell, the second cell, or both during the set of time resources based on the cancellation indication. The operations of 1315 may be performed in accordance with examples as disclosed herein. In some examples, aspects of the operations of 1315 may be performed by a shared channel component 835 as described with reference to FIG. 8.

Figure 14:
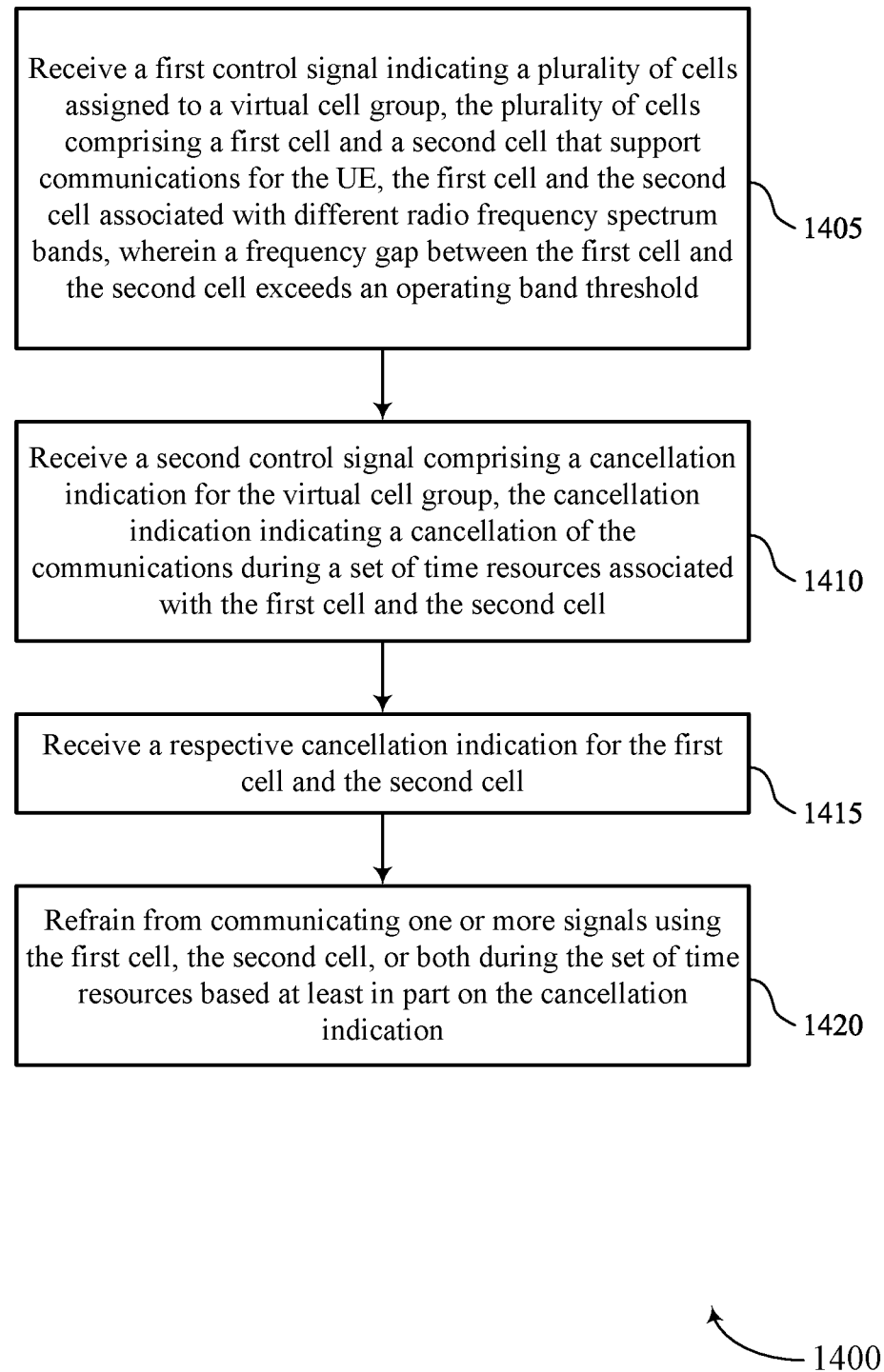

FIG. 14 shows a flowchart illustrating a method 1400 that supports virtual cell grouping for wireless communications in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold. The operations of 1405 may be performed in accordance with examples as disclosed herein. In some examples, aspects of the operations of 1405 may be performed by a cell assignment component 825 as described with reference to FIG. 8.

At 1410, the method may include receiving a second control signal including a cancellation indication for the virtual cell group, the cancellation indication indicating a cancellation of the communications during a set of time resources associated with the first cell and the second cell. The operations of 1410 may be performed in accordance with examples as disclosed herein. In some examples, aspects of the operations of 1410 may be performed by a cancellation component 840 as described with reference to FIG. 8.

At 1415, the method may include receiving a respective cancellation indication for the first cell and the second cell. The operations of 1415 may be performed in accordance with examples as disclosed herein. In some examples, aspects of the operations of 1415 may be performed by a cancellation component 840 as described with reference to FIG. 8.

At 1420, the method may include refraining from communicating one or more signals using the first cell, the second cell, or both during the set of time resources based on the cancellation indication. The operations of 1420 may be performed in accordance with examples as disclosed herein. In some examples, aspects of the operations of 1420 may be performed by a shared channel component 835 as described with reference to FIG. 8.

Figure 15:
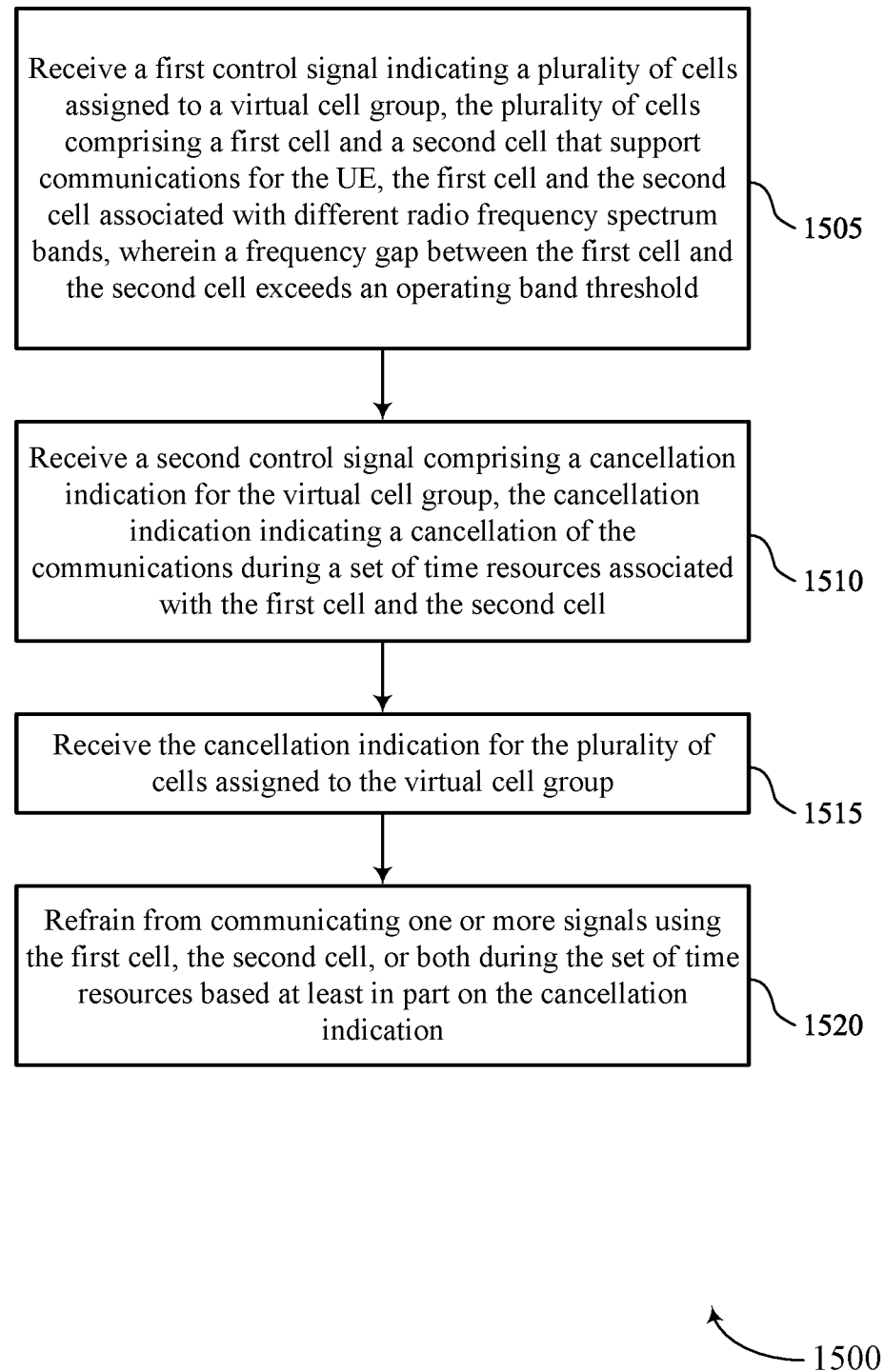

FIG. 15 shows a flowchart illustrating a method 1500 that supports virtual cell grouping for wireless communications in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a first control signal indicating a set of multiple cells assigned to a virtual cell group, the set of multiple cells including a first cell and a second cell that support communications for the UE, the first cell and the second cell associated with different radio frequency spectrum bands, where a frequency gap between the first cell and the second cell exceeds an operating band threshold. The operations of 1505 may be performed in accordance with examples as disclosed herein. In some examples, aspects of the operations of 1505 may be performed by a cell assignment component 825 as described with reference to FIG. 8.

At 1510, the method may include receiving a second control signal including a cancellation indication for the virtual cell group, the cancellation indication indicating a cancellation of the communications during a set of time resources associated with the first cell and the second cell. The operations of 1510 may be performed in accordance with examples as disclosed herein. In some examples, aspects of the operations of 1510 may be performed by a cancellation component 840 as described with reference to FIG. 8.

At 1515, the method may include receiving the cancellation indication for the set of multiple cells assigned to the virtual cell group. The operations of 1515 may be performed in accordance with examples as disclosed herein. In some examples, aspects of the operations of 1515 may be performed by a cancellation component 840 as described with reference to FIG. 8.

At 1520, the method may include refraining from communicating one or more signals using the first cell, the second cell, or both during the set of time resources based on the cancellation indication. The operations of 1520 may be performed in accordance with examples as disclosed herein. In some examples, aspects of the operations of 1520 may be performed by a shared channel component 835 as described with reference to FIG. 8.

The following provides an overview of aspects of the present disclosure:

Aspect 1: A method for wireless communication at a UE, comprising: receiving a first control signal indicating a plurality of cells assigned to a virtual cell group, the plurality of cells comprising a first cell and a second cell that support communications for the UE, the first cell and the second cell associated with different radio frequency spectrum bands, wherein a frequency gap between the first cell and the second cell exceeds an operating band threshold; receiving a second control signal that indicates resource allocation information for the virtual cell group, the resource allocation information indicating a first set of resource allocation information for a first shared channel for the first cell and a second set of resource allocation information for a second shared channel for the second cell; and communicating the first shared channel via the first cell based at least in part on the first set of resource allocation information and the second shared channel via the second cell based at least in part on the second set of resource allocation information.

Aspect 2: The method of aspect 1, wherein receiving the second control signal comprises: receiving an indication that one or more first indices in a resource grid corresponding to the virtual cell group and one or more second indices in the resource grid corresponding to the virtual cell group are non-consecutive between the first cell and the second cell, wherein the resource allocation information indicates that one or more indices are assigned to resources associated with the frequency gap.

Aspect 3: The method of aspect 1, wherein receiving the second control signal comprises: receiving an indication that one or more first indices in a resource grid corresponding to the virtual cell group and one or more second indices in the resource grid corresponding to the virtual cell group are consecutive between the first cell and the second cell.

Aspect 4: The method of any of aspects 1 through 3, wherein receiving the second control signal comprises: receiving an indication of a resource grid that is common between the first cell and the second cell, wherein a resource group size associated with the resource allocation information is based at least in part on a number of resource blocks associated with the virtual cell group.

Aspect 5: The method of any of aspects 1 through 4, wherein the virtual cell group is associated with a first bandwidth part, the method comprising receiving a third control signal that indicates for the UE to switch from one or more second bandwidth parts per cell in the virtual cell group to the first bandwidth part; and performing the bandwidth part switching for the plurality of cells in accordance with the third control signal, wherein receiving the second control signal is based at least in part on performing the bandwidth part switching.

Aspect 6: The method of aspect 5, further comprising: switching a transport block operation from a first operation with a transport block per cell in the virtual cell group and a second operation with the transport block for the virtual cell group based at least in part on performing the bandwidth part switching.

Aspect 7: The method of any of aspects 5 through 6, further comprising: switching a control signal operation from a first operation with a control signal per cell in the virtual cell group and a second operation with the control signal for the virtual cell group based at least in part on performing the bandwidth part switching.

Aspect 8: The method of any of aspects 5 through 7, further comprising: switching a cell configuration operation from a first operation with a configuration for first communications per cell in the virtual cell group and a second operation with the configuration for second communications for the virtual cell group based at least in part on performing the bandwidth part switching.

Aspect 9: The method of any of aspects 1 through 8, wherein receiving the second control signal comprises: receiving an indication of a first gap between a first uplink resource and a first downlink resource associated with the first cell and of a second gap between a second uplink resource and a second downlink resource associated with the second cell.

Aspect 10: The method of any of aspects 1 through 9, further comprising: activating a first bandwidth part for the first cell based at least in part on the first set of resource allocation information; and activating a second bandwidth part for the second cell based at least in part on the second set of resource allocation information.

Aspect 11: The method of aspect 10, further comprising: determining that a plurality of physical resource blocks for the communicating are indexed according to the first bandwidth part and the second bandwidth part; and selecting one or more parameters for the first bandwidth part for the first cell and the second bandwidth part for the second cell based at least in part on the determining.

Aspect 12: The method of any of aspects 1 through 11, wherein the first set of resource allocation information indicates a first set of unpaired uplink and downlink resources for the first shared channel and the second set of resource allocation information indicates a second set of unpaired uplink and downlink resources for the second shared channel, the method further comprising: activating a bandwidth part for the virtual cell group based at least in part on a set of bandwidth part parameters determined based at least in part on the resource allocation information, the bandwidth part corresponding to a first bandwidth for the first cell and corresponding to a second bandwidth for the second cell.

Aspect 13: The method of aspect 12, further comprising: determining a plurality of physical resource blocks for the communicating are indexed according to the first cell and the second cell; and selecting the set of bandwidth part parameters for the virtual cell group based at least in part on the determining.

Aspect 14: The method of any of aspects 1 through 13, wherein the communicating comprises: communicating a first transport block using the first cell and a second transport block using the second cell.

Aspect 15: The method of any of aspects 1 through 13, wherein the communicating comprises: communicating a first portion of a transport block associated with the virtual cell group using the first cell and a second portion of the transport block using the second cell.

Aspect 16: The method of any of aspects 1 through 15, wherein the communicating comprises: receiving a signal using the first cell based at least in part on the first set of resource allocation information, using the second cell based at least in part on the second set of resource allocation information, or both.

Aspect 17: The method of any of aspects 1 through 16, wherein the communicating comprises: transmitting a signal using the first cell based at least in part on the first set of resource allocation information, using the second cell based at least in part on the second set of resource allocation information, or both.

Aspect 18: The method of any of aspects 1 through 17, wherein the first control signal indicates that the plurality of cells correspond to a downlink communication direction, the method further comprising: receiving a first signal using the first cell based at least in part on the first set of resource allocation information, using the second cell based at least in part on the second set of resource allocation information, or both; receiving a third control signal that indicates additional resource allocation information for a third cell, wherein the third cell is excluded from the virtual cell group; and transmitting a second signal using the third cell based at least in part on the additional resource allocation information.

Aspect 19: The method of any of aspects 1 through 18, wherein the plurality of cells in the virtual cell group are associated with a downlink communication direction and a subset of cells of the plurality of cells in the virtual cell group are associated with an uplink communication direction.

Aspect 20: The method of any of aspects 1 through 19, wherein the first control signal comprises a radio resource control signal.

Aspect 21: The method of any of aspects 1 through 20, wherein the second control signal comprises a downlink control information message.

Aspect 22: A method for wireless communication at a UE, comprising: receiving a first control signal indicating a plurality of cells assigned to a virtual cell group, the plurality of cells comprising a first cell and a second cell that support communications for the UE, the first cell and the second cell associated with different radio frequency spectrum bands, wherein a frequency gap between the first cell and the second cell exceeds an operating band threshold; receiving a second control signal comprising a cancellation indication for the virtual cell group, the cancellation indication indicating a cancellation of the communications during a set of time resources associated with the first cell and the second cell; and refraining from communicating one or more signals using the first cell, the second cell, or both during the set of time resources based at least in part on the cancellation indication.

Aspect 23: The method of aspect 22, wherein receiving the second control signal comprises: receiving a respective cancellation indication for the first cell and the second cell.

Aspect 24: The method of aspect 22, wherein receiving the second control signal comprises: receiving the cancellation indication for the plurality of cells assigned to the virtual cell group.

Aspect 25: The method of any of aspects 22 through 24, further comprising: determining the set of time resources span a portion of a transport block; and refraining from communicating the one or more signals during the portion of the transport block.

Aspect 26: The method of any of aspects 22 through 24, further comprising: determining the set of time resources span a transport block; and refraining from communicating the one or more signals during the transport block.

Aspect 27: An apparatus for wireless communication at a UE, comprising a processor; memory coupled with the processor; and instructions stored in the memory and executable by the processor to cause the apparatus to perform a method of any of aspects 1 through 21.

Aspect 28: An apparatus for wireless communication at a UE, comprising at least one means for performing a method of any of aspects 1 through 21.

Aspect 29: A non-transitory computer-readable medium storing code for wireless communication at a UE, the code comprising instructions executable by a processor to perform a method of any of aspects 1 through 21.

Aspect 30: An apparatus for wireless communication at a UE, comprising a processor; memory coupled with the processor; and instructions stored in the memory and executable by the processor to cause the apparatus to perform a method of any of aspects 22 through 26.

Aspect 31: An apparatus for wireless communication at a UE, comprising at least one means for performing a method of any of aspects 22 through 26.

Aspect 32: A non-transitory computer-readable medium storing code for wireless communication at a UE, the code comprising instructions executable by a processor to perform a method of any of aspects 22 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a first control signal indicating a plurality of cells assigned to a virtual cell group, the plurality of cells comprising a first cell and a second cell that support communications for the UE, the first cell and the second cell associated with different radio frequency spectrum bands, wherein a frequency gap between the first cell and the second cell exceeds an operating band threshold;
   receiving a second control signal that indicates resource allocation information for the virtual cell group, the resource allocation information indicating a first set of resource allocation information for a first shared channel for the first cell and a second set of resource allocation information for a second shared channel for the second cell; and
   communicating the first shared channel via the first cell based at least in part on the first set of resource allocation information and the second shared channel via the second cell based at least in part on the second set of resource allocation information.

2. The method of claim 1, wherein receiving the second control signal comprises:
   receiving an indication that one or more first indices in a resource grid corresponding to the virtual cell group and one or more second indices in the resource grid corresponding to the virtual cell group are non-consecutive between the first cell and the second cell, wherein the resource allocation information indicates that one or more indices are assigned to resources associated with the frequency gap.

3. The method of claim 1, wherein receiving the second control signal comprises:
   receiving an indication that one or more first indices in a resource grid corresponding to the virtual cell group and one or more second indices in the resource grid corresponding to the virtual cell group are consecutive between the first cell and the second cell.

4. The method of claim 1, wherein receiving the second control signal comprises:
   receiving an indication of a resource grid that is common between the first cell and the second cell, wherein a resource group size associated with the resource allocation information is based at least in part on a number of resource blocks associated with the virtual cell group.

5. The method of claim 1, wherein the virtual cell group is associated with a first bandwidth part, the method comprising:
   receiving a third control signal that indicates for the UE to switch from one or more second bandwidth parts per cell in the virtual cell group to the first bandwidth part; and
   performing the bandwidth part switching for the plurality of cells in accordance with the third control signal, wherein receiving the second control signal is based at least in part on performing the bandwidth part switching.

6. The method of claim 5, further comprising:
   switching a transport block operation from a first operation with a transport block per cell in the virtual cell group and a second operation with the transport block for the virtual cell group based at least in part on performing the bandwidth part switching.

7. The method of claim 5, further comprising:
   switching a control signal operation from a first operation with a control signal per cell in the virtual cell group and a second operation with the control signal for the virtual cell group based at least in part on performing the bandwidth part switching.

8. The method of claim 5, further comprising:
   switching a cell configuration operation from a first operation with a configuration for first communications per cell in the virtual cell group and a second operation with the configuration for second communications for the virtual cell group based at least in part on performing the bandwidth part switching.

9. The method of claim 1, wherein receiving the second control signal comprises:
receiving an indication of a first gap between a first uplink resource and a first downlink resource associated with the first cell and of a second gap between a second uplink resource and a second downlink resource associated with the second cell.

10. The method of claim 1, further comprising:
activating a first bandwidth part for the first cell based at least in part on the first set of resource allocation information; and
activating a second bandwidth part for the second cell based at least in part on the second set of resource allocation information.

11. The method of claim 10, further comprising:
determining that a plurality of physical resource blocks for the communicating are indexed according to the first bandwidth part and the second bandwidth part; and
selecting one or more parameters for the first bandwidth part for the first cell and the second bandwidth part for the second cell based at least in part on the determining.

12. The method of claim 1, wherein the first set of resource allocation information indicates a first set of unpaired uplink and downlink resources for the first shared channel and the second set of resource allocation information indicates a second set of unpaired uplink and downlink resources for the second shared channel, the method further comprising:
activating a bandwidth part for the virtual cell group based at least in part on a set of bandwidth part parameters determined based at least in part on the resource allocation information, the bandwidth part corresponding to a first bandwidth for the first cell and corresponding to a second bandwidth for the second cell.

13. The method of claim 12, further comprising:
determining a plurality of physical resource blocks for the communicating are indexed according to the first cell and the second cell; and
selecting the set of bandwidth part parameters for the virtual cell group based at least in part on the determining.

14. The method of claim 1, wherein the communicating comprises:
communicating a first transport block using the first cell and a second transport block using the second cell.

15. The method of claim 1, wherein the communicating comprises:
communicating a first portion of a transport block associated with the virtual cell group using the first cell and a second portion of the transport block using the second cell.

16. The method of claim 1, wherein the communicating comprises:
receiving a signal using the first cell based at least in part on the first set of resource allocation information, using the second cell based at least in part on the second set of resource allocation information, or both.

17. The method of claim 1, wherein the communicating comprises:
transmitting a signal using the first cell based at least in part on the first set of resource allocation information, using the second cell based at least in part on the second set of resource allocation information, or both.

18. The method of claim 1, wherein the first control signal indicates that the plurality of cells correspond to a downlink communication direction, the method further comprising:
receiving a first signal using the first cell based at least in part on the first set of resource allocation information, using the second cell based at least in part on the second set of resource allocation information, or both;
receiving a third control signal that indicates additional resource allocation information for a third cell, wherein the third cell is excluded from the virtual cell group; and
transmitting a second signal using the third cell based at least in part on the additional resource allocation information.

19. The method of claim 1, wherein the plurality of cells in the virtual cell group are associated with a downlink communication direction and a subset of cells of the plurality of cells in the virtual cell group are associated with an uplink communication direction.

20. The method of claim 1, wherein the first control signal comprises a radio resource control signal.

21. The method of claim 1, wherein the second control signal comprises a downlink control information message.

22. An apparatus for wireless communication at a user equipment (UE), comprising:
one or more processors;
memory coupled with the one or more processors; and
instructions stored in the memory and executable by the one or more processors to cause the apparatus to:
receive a first control signal indicating a plurality of cells assigned to a virtual cell group, the plurality of cells comprising a first cell and a second cell that support communications for the UE, the first cell and the second cell associated with different radio frequency spectrum bands, wherein a frequency gap between the first cell and the second cell exceeds an operating band threshold;
receive a second control signal that indicates resource allocation information for the virtual cell group, the resource allocation information indicating a first set of resource allocation information for a first shared channel for the first cell and a second set of resource allocation information for a second shared channel for the second cell; and
communicate the first shared channel via the first cell based at least in part on the first set of resource allocation information and the second shared channel via the second cell based at least in part on the second set of resource allocation information.

23. The apparatus of claim 22, wherein the instructions to receive the second control signal are executable by the one or more processors to cause the apparatus to:
receive an indication that one or more first indices in a resource grid corresponding to the virtual cell group and one or more second indices in the resource grid corresponding to the virtual cell group are non-consecutive between the first cell and the second cell, wherein the resource allocation information indicates that one or more indices are assigned to resources associated with the frequency gap.

24. The apparatus of claim 22, wherein the instructions to receive the second control signal are executable by the one or more processors to cause the apparatus to:
receive an indication that one or more first indices in a resource grid corresponding to the virtual cell group and one or more second indices in the resource grid corresponding to the virtual cell group are consecutive between the first cell and the second cell.

25. The apparatus of claim 22, wherein the instructions to receive the second control signal are executable by the one or more processors to cause the apparatus to:
receive an indication of a resource grid that is common between the first cell and the second cell, wherein a resource group size associated with the resource allocation information is based at least in part on a number of resource blocks associated with the virtual cell group.

26. The apparatus of claim 22, wherein the virtual cell group is associated with a first bandwidth part and the instructions are executable by the one or more processors to cause the apparatus to:
receive a third control signal that indicates for the UE to switch from one or more second bandwidth parts per cell in the virtual cell group to the first bandwidth part; and
perform the bandwidth part switching for the plurality of cells in accordance with the third control signal, wherein receiving the second control signal is based at least in part on performing the bandwidth part switching.

27. The apparatus of claim 22, wherein the instructions to receive the second control signal are executable by the one or more processors to cause the apparatus to:
receive an indication of a first gap between a first uplink resource and a first downlink resource associated with the first cell and of a second gap between a second uplink resource and a second downlink resource associated with the second cell.

28. The apparatus of claim 22, wherein the instructions are executable by the one or more processors to cause the apparatus to:
activate a first bandwidth part for the first cell based at least in part on the first set of resource allocation information; and
activate a second bandwidth part for the second cell based at least in part on the second set of resource allocation information.

29. A non-transitory computer-readable medium storing code for wireless communication at a user equipment (UE), the code comprising instructions executable by one or more processors to:
receive a first control signal indicating a plurality of cells assigned to a virtual cell group, the plurality of cells comprising a first cell and a second cell that support communications for the UE, the first cell and the second cell associated with different radio frequency spectrum bands, wherein a frequency gap between the first cell and the second cell exceeds an operating band threshold;
receive a second control signal that indicates resource allocation information for the virtual cell group, the resource allocation information indicating a first set of resource allocation information for a first shared channel for the first cell and a second set of resource allocation information for a second shared channel for the second cell; and
communicate the first shared channel via the first cell based at least in part on the first set of resource allocation information and the second shared channel via the second cell based at least in part on the second set of resource allocation information.

30. An apparatus for wireless communication at a user equipment (UE), comprising:
means for receiving a first control signal indicating a plurality of cells assigned to a virtual cell group, the plurality of cells comprising a first cell and a second cell that support communications for the UE, the first cell and the second cell associated with different radio frequency spectrum bands, wherein a frequency gap between the first cell and the second cell exceeds an operating band threshold;
means for receiving a second control signal that indicates resource allocation information for the virtual cell group, the resource allocation information indicating a first set of resource allocation information for a first shared channel for the first cell and a second set of resource allocation information for a second shared channel for the second cell; and
means for communicating the first shared channel via the first cell based at least in part on the first set of resource allocation information and the second shared channel via the second cell based at least in part on the second set of resource allocation information.

* * * * *